United States Patent
Okada et al.

(10) Patent No.: US 8,605,617 B2
(45) Date of Patent: Dec. 10, 2013

(54) PACKET CAPTURE SYSTEM, PACKET CAPTURE METHOD, INFORMATION PROCESSING DEVICE, AND STORAGE MEDIUM

(75) Inventors: Sumiyo Okada, Kawasaki (JP); Noriyuki Fukuyama, Kawasaki (JP); Masanobu Morinaga, Kawasaki (JP); Hideaki Miyazaki, Kobe (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 13/189,853

(22) Filed: Jul. 25, 2011

(65) Prior Publication Data

US 2011/0280149 A1  Nov. 17, 2011

Related U.S. Application Data

(63) Continuation of application No. PCT/JP2009/000398, filed on Feb. 2, 2009.

(51) Int. Cl.
  *G01R 31/08* (2006.01)
  *H04L 12/28* (2006.01)

(52) U.S. Cl.
  USPC ............................................ 370/252; 370/400

(58) Field of Classification Search
  USPC ............................................................ 370/252
  See application file for complete search history.

(56) References Cited

U.S. PATENT DOCUMENTS

| | | | | |
|---|---|---|---|---|
| 5,155,852 A | * | 10/1992 | Murakami et al. | 718/100 |
| 6,137,782 A | * | 10/2000 | Sharon et al. | 370/255 |
| 6,363,056 B1 | * | 3/2002 | Beigi et al. | 370/252 |
| 6,570,857 B1 | * | 5/2003 | Haartsen et al. | 370/312 |
| 6,785,263 B1 | * | 8/2004 | Morinaga et al. | 370/352 |
| 6,937,540 B1 | * | 8/2005 | Kikuchi et al. | 369/30.03 |
| 8,018,900 B2 | * | 9/2011 | Blanchette et al. | 370/331 |
| 2001/0019422 A1 | * | 9/2001 | Hara | 358/1.15 |

FOREIGN PATENT DOCUMENTS

| | | |
|---|---|---|
| JP | 11-88328 | 3/1999 |
| JP | 2004-229217 | 8/2004 |
| JP | 2004-356953 | 12/2004 |
| JP | 2006-203276 | 8/2006 |

OTHER PUBLICATIONS

Partial English Translation of Japanese Reference 11-88328, publication date Mar. 30, 1999.
Partial English Translation of VSS monitoring-distribution-network taps, http://www.vssmonitoring.com.jp/products/products_list.asp?title=network_taps&keyword=injection.

(Continued)

*Primary Examiner* — Gerald Smarth
(74) *Attorney, Agent, or Firm* — Staas & Halsey LLP

(57) ABSTRACT

A sharing control processing unit controls sharing of capture of packets among measuring devices connected to the same network. An aggregating unit collects the captured packets. Each measuring device notifies the sharing control processing unit of a state about its capture. The sharing control processing unit determines which measuring device is to start/stop the capture, according to a predetermined rule and the notified state. When determining that the capture is to be switched from a first measuring device to a second measuring device, the sharing control processing unit instructs the second measuring device to start the capture. After receiving a notification that the second measuring device has actually captured a packet(s), the sharing control processing unit instructs the first measuring device to stop the capture. The aggregating unit identifies a duplicate packet(s) double captured by the first and second measuring devices.

13 Claims, 15 Drawing Sheets

(56) References Cited

OTHER PUBLICATIONS

Partial English Translation of Port-mirroring, http://www.hitachi.co.jp/Prod/comp/network/manual/router/gr4k/1004/HTML/CFREF2/0045.HTM.

Partial English Translation of Overview of Port Mirroring, http://www.hitachi.co.jp/Prod/comp/network/manual/switch/gs4k/0904/HTML/APGUIDE2/0173.HTM.

International Search Report for PCT/JP2009/000398, Mailed Feb. 24, 2009.

VSS monitoring-distribution-network taps, http://www.vssmonitoring.com.jp/products/products_list.asp?title=network_taps&keyword=injection.

Port-mirroring, http://www.hitachi.co.jp/Prod/comp/network/manual/router/gr4k/1004/HTML/CFREF2/0045.HTM.

Overview of Port Mirroring, http://www.hitachi.co.jp/Prod/comp/network/manual/switch/gs4k/0904/HTML/APGUIDE2/0173.HTM.

* cited by examiner

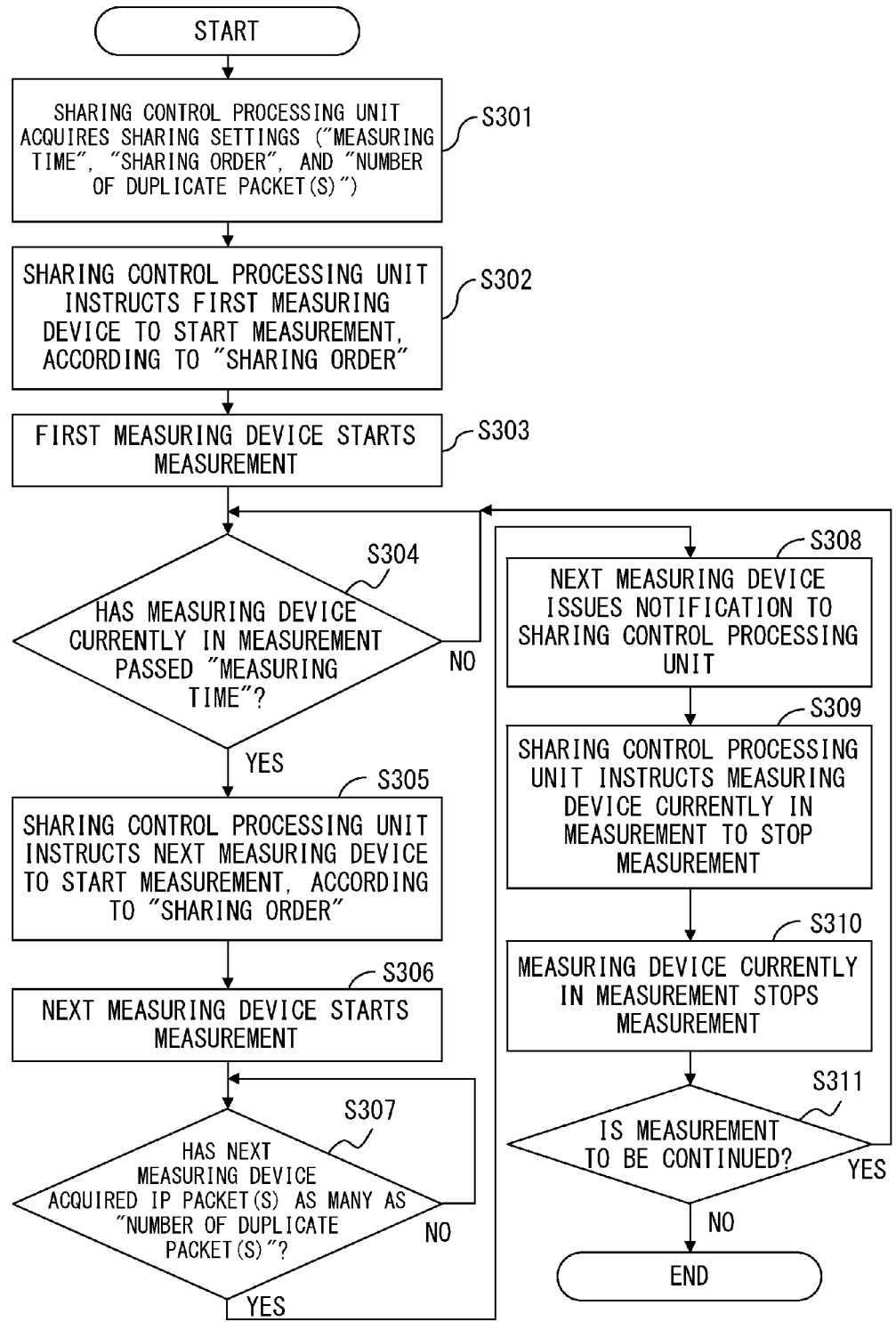
F I G. 6

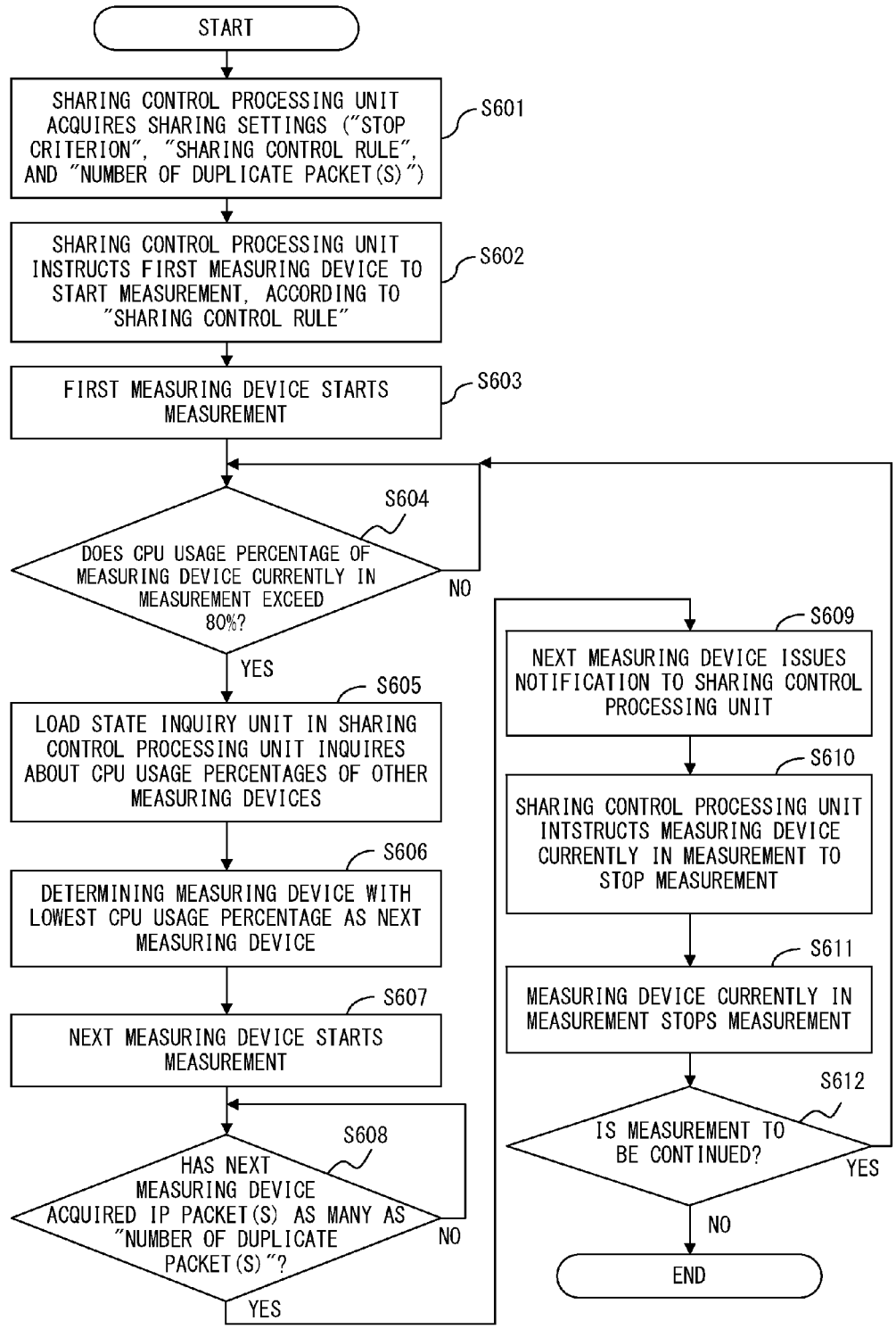
F I G. 1 1

PACKET CAPTURE SYSTEM, PACKET CAPTURE METHOD, INFORMATION PROCESSING DEVICE, AND STORAGE MEDIUM

CROSS-REFERENCE TO RELATED APPLICATION

This is a continuation of PCT application PCT/JP2009/000398, which was filed on Feb. 2, 2009, and the entire contents of which are incorporated herein by reference.

FIELD

The embodiments disclosed herein relate to a packet capture system, a packet capture method, an information processing device, and a storage medium.

BACKGROUND

Recently, packets flowing in a packet communication network are captured (i.e., acquired) in various fields. For example, packets are captured to monitor an IP (Internet Protocol) network and to control the quality of VoIP (Voice over Internet Protocol). Especially, in these years, the market scale of the VoIP service (for example, an IP telephony service) in Japan, and the market scale of the VoIP equipment of domestic corporations in Japan have made a remarkable growth, and are expected to make a further growth at a high rate. Therefore, the importance of the VoIP quality control system has been highly evaluated.

Furthermore, depending on the purpose of the packet capture, "full capture" is performed. The full capture means to fully capture all packets that flow through a point to be monitored in a network. The full capture is performed by, for example, forensic products. Some IP network monitor systems and some kind of VoIP quality control may naturally involve a full capture device.

One of the factors affecting the quality of communications by the VoIP is a fact that a fluctuation (also referred to as a jitter) in an interval between packets, which are transmitted regularly, is caused at a destination due to the influence of a network. Therefore, for example, the quality of the communications through the VoIP may also be monitored by providing a monitor device in advance on a network path where calls are concentrated, by capturing all packets relating to the communications whose quality is to be measured, and by analyzing the jitter in real time.

Furthermore, to control the quality of communications, not only the jitter, but also various amounts (such as the amount of traffic, a loss rate of packets, the delay time from a source to a destination, etc.) may be targeted to be measured. Some measurement targets may require the full capture. The comparison between the measured communication quality value and the control reference value that is set in advance by a network administrator or anyone else enables automatic determination of the communication state and monitoring of the packet communication network.

However, an expensive dedicated device may be required when it is attempted to use only one monitor device for realizing the full capture and for making an analyzing process in real time continuable even if the number of communications becomes large. The reason is that the capacity of a buffer memory provided in a general-purpose monitor device and the processing capability of a CPU (central processing unit) provided in a general-purpose monitor device may be insufficient to cope with the amount of communications at the peak, and therefore may fail to guarantee the full capture and the analysis in real time. For example, when a general-purpose monitor device is used, there may occur capture failure due to a buffer overflow when there are a large number of communications.

Therefore, to realize the full capture without an expensive device, it is considered to capture a large number of IP packets by sharing the capture among a plurality of devices.

For example, a traffic gathering/analyzing system is proposed that includes a plurality of traffic gathering/analyzing devices and sharing adjustment means. The plurality of traffic gathering/analyzing devices are connected on the same network segment and each gathering/analyzing device is provided with traffic gathering/analyzing means. Furthermore, the sharing adjustment means adjusts the sharing among these traffic gathering/analyzing means. The sharing adjustment means controls each traffic gathering/analyzing means so that these traffic gathering/analyzing means share the gathering and analysis of the traffic on the network segment without fail.

In the traffic gathering/analyzing system, for example, a method is used in which time synchronization among the traffic gathering/analyzing devices is performed, a time period for gathering the traffic is assigned to each gathering process (i.e., each gathering object), and thereby the sharing is determined. That is, each gathering process is determined to execute the gathering/analyzing processing only on the packets which pass through the segment in the assigned time period. In this case, in order to avoid an omission during handover, it is necessary to leave a margin (i.e., an overlap), which is sufficient with respect to the accuracy of the synchronization, between consecutive gathering times of the gathering objects.

[Patent Document 1] Japanese Laid-open Patent Publication No. 11-88328

SUMMARY

According to an aspect, a packet capture system is provided. The packet capture system includes a plurality of measuring devices, a sharing control processing unit, and an aggregating unit.

The plurality of measuring devices are connected to a same network and are each configured to capture a packet flowing on the network. The sharing control processing unit controls sharing of capture of packets flowing on the network among the plurality of measuring devices. The aggregating unit collects the packets captured by the plurality of measuring devices.

In more detail, each individual measuring device in the plurality of measuring devices includes a capture control unit and a capture state notification unit. The sharing control processing unit includes a sharing control unit and a sharing instruction unit.

The capture control unit controls a start and a stop of the capture by the individual measuring device. The capture state notification unit notifies the sharing control processing unit of a state about the capture performed under control by the capture control unit.

The sharing control unit determines which of the plurality of measuring devices is to start the capture, and which of the plurality of measuring devices is to stop the capture, wherein determination by the sharing control unit is made according to a predetermined sharing control rule and the state notified from the capture state notification unit. The sharing instruction unit instructs the plurality of measuring devices to start or stop the capture, wherein instruction by the sharing instruction unit is made according to the determination by the sharing control unit. When the sharing control unit determines that the capture is to be switched from a first measuring device to a second measuring device, the sharing instruction unit instructs the second measuring device to start the capture. After the capture state notification unit in the second measuring device notifies the sharing control processing unit of a first state indicating that the second measuring device has actually captured one or more packets, the sharing instruction unit instructs the first measuring device to stop the capture The aggregating unit identifies one or more duplicate packets double captured by the first and the second measuring devices and double collected from the first and the second measuring devices. According to the identified one or more duplicate packets, the aggregating unit reconstructs without duplication the packets flowing on the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart of a capturing operation according to the first embodiment;

FIG. 11 is a flowchart of a capturing operation according to the second embodiment;

DESCRIPTION OF EMBODIMENTS

The embodiments are described below in detail with reference to the attached drawings. First, the common points among the first through third embodiments are described with reference to FIGS. 1 through 3. Next, the first embodiment is described with reference to FIGS. 4 through 8. Then, the second embodiment is described with reference to FIGS. 9 through 11, and the third embodiment is described with reference to FIGS. 12 through 15. Finally, other embodiments are described.

Figure 1:
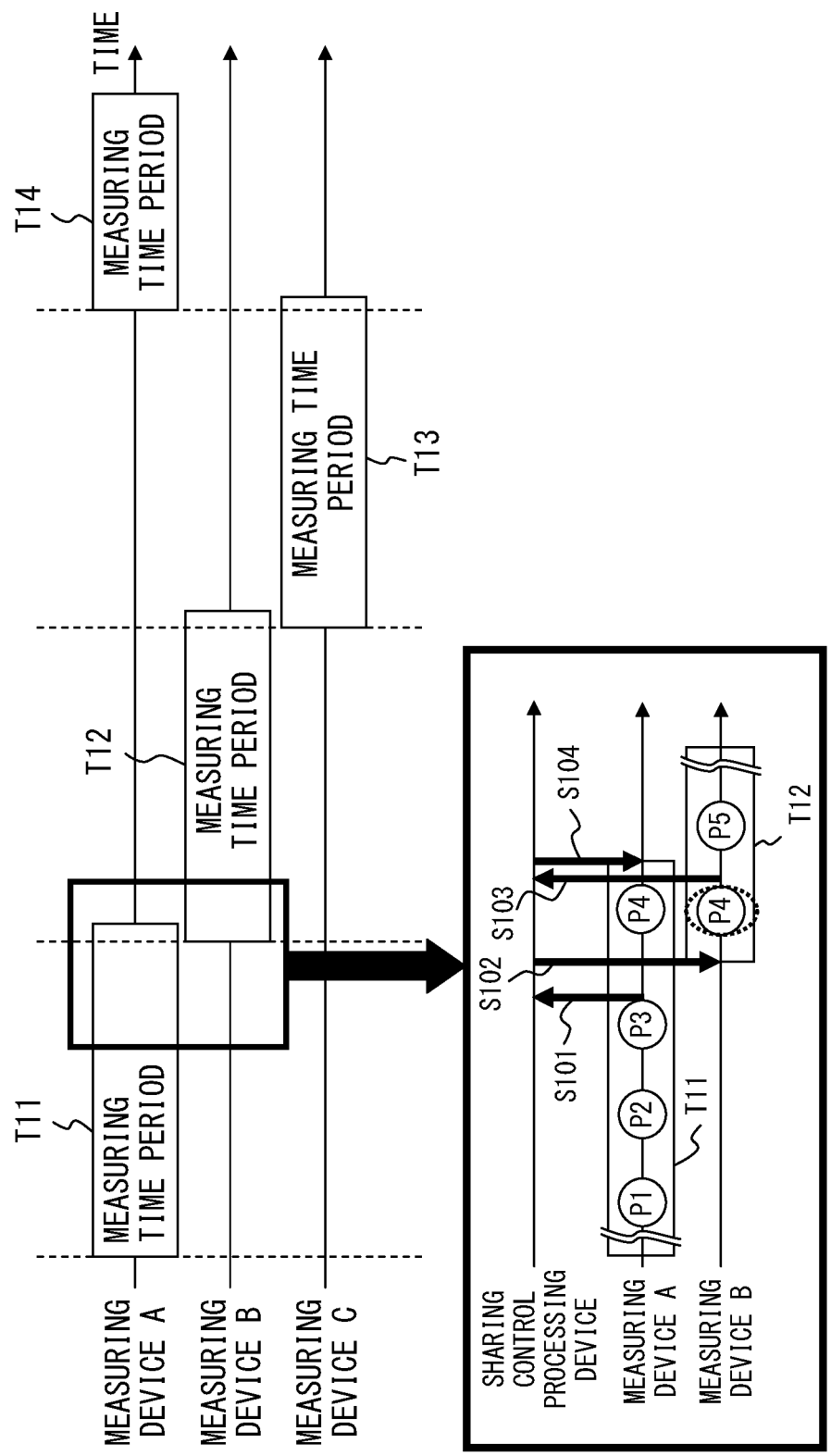
FIG. 1 is an explanatory view of a common capturing operation among the first through third embodiments.

FIG. 1 is an explanatory view of a common capturing operation among the first through third embodiments. The horizontal axes in FIG. 1 are time axes.

In any of the first through third embodiments, a plurality of measuring devices capture packets in turn. That is, the plurality of measuring devices share the capture of packets in a time-sharing manner. The differences among the first through third embodiments are described later in detail, but in summary, they lie in a trigger of handover, a method of determining the order of handover, etc.

According to the capturing operation in FIG. 1, in a packet capture system including measuring devices A through C and a sharing control processing device, the realization of the full capture, by which all target packets are fully captured without fail, is enabled even if the time synchronization is not performed among the measuring devices A through C.

A specific example of the configuration of the packet capture system is described later with reference to FIG. 3, but in summary, the measuring devices A through C are connected to the same network each through a device such as a network tap (hereafter referred to simply as a "tap") and capture packets flowing on the network. For example, the measuring devices A through C may be included in one collision domain.

Furthermore, as described later in detail, the sharing control processing device is a device that is enabled to communicate with each of the measuring devices A through C. The sharing control processing device may be incorporated into any of the measuring devices A through C, or may be an external device independent of the measuring devices A through C.

In the description below, the period in which an individual measuring device captures a packet(s) flowing on the network is referred to as a "measuring time period".

In FIG. 1, the measuring devices A, B, and C capture a packet(s) in the measuring time periods T11, T12, and T13, respectively. As illustrated in FIG. 1, the measuring time periods T11 and T12 partially overlap each other, and the measuring time periods T12 and T13 partially overlap each other. The full capture is guaranteed by the sharing control processing device controlling the operation of each of the measuring devices A through C so that any two adjacent measuring time periods appropriately overlap each other.

FIG. 1 further illustrates the details of the overlap between the measuring time periods T11 and T12. In the example in FIG. 1, the state about the capture changes at a time point between the time point at which the measuring device A captures a packet P3 and the time point at which the measuring device A captures a packet P4, and thereby a predetermined criterion (hereafter referred to as a "stop criterion") is satisfied. The stop criterion is described later in detail. When the stop criterion is satisfied, the measuring device A in the execution of the capture starts preparing to stop the capture.

That is, since the stop criterion is not satisfied when the measuring device A captures a packet P1 and when the measuring device A captures a packet P2, the measuring device A continues the capture at these moments. Furthermore, even after the stop criterion is satisfied, the measuring device A does not stop the capture immediately. Therefore, the measuring device A also captures the packet P4, which is subsequent to the packet P3.

The satisfaction of the stop criterion is a trigger of the handover of the capture from the measuring device A to another measuring device. Specifically, when the measuring device A recognizes that the stop criterion has been satisfied, the measuring device A notifies, in step S101, the sharing control processing device of the state in which the stop criterion is satisfied. That is, in step S101, the measuring device A notifies the sharing control processing device that the measuring device A plans to stop the capture.

Upon receipt of the notification in step S101, the sharing control processing device determines, according to a predetermined rule (hereafter referred to as a "sharing control rule"), a measuring device to next perform the capture. Specific examples of the sharing control rule are described later. FIG. 1 is an example of the case in which the sharing control processing device selects the measuring device B as a measuring device for next performing the capture.

Upon determining the measuring device B as a measuring device for next performing the capture, then in step S102, the sharing control processing device instructs the measuring device B to start capturing packets. At the instruction, the measuring device B starts capturing packets, and the measuring time period T12 starts.

In the example in FIG. 1, since the packet P4 flows on the network after step S102, the packet P4 is captured by both the measuring devices A and B. Hereafter, a packet that is double captured by two measuring devices during the handover, during which the measuring device in charge of capturing packets is changed from one of the two measuring devices to the other, is referred to as a "duplicate packet".

After capturing the packet P4, then in step S103, the measuring device B notifies the sharing control processing device of the state that the measuring device B has actually captured the packet P4. In the example in FIG. 1, issuing the notification in step S103 is triggered when one packet P4 is captured. However, in some embodiments, the measuring device B may issue the notification in step S103 after capturing a plurality of packets.

The notification in step S103 is issued according to a condition predetermined with respect to a duplicate packet(s) (hereafter this condition is referred to as a "duplicate packet condition"). The duplicate packet condition is described later in detail. In the example in FIG. 1, for example, a condition used as the duplicate packet condition may be the condition that the number of packet(s) captured by the measuring device B reached one after the measuring device B starts the capture at the instruction in step S102.

Upon receipt of the notification in step S103, then in step S104, the sharing control processing device instructs the measuring device A to stop the capture. Then, at the instruction, the measuring device A stops the packet capture, thereby terminating the measuring time period T11.

In the operation above, what triggers the measuring device A to stop the capture is not an event that the measuring device B starts the capturing operation, but an event that the measuring device B actually succeeds in the capture of a packet(s) (to be more precise, an event that the duplicate packet condition is satisfied). Therefore, it is guaranteed that at least one packet is double captured by the measuring devices A and B.

Therefore, according to the capturing operation in FIG. 1, a so-called "capture failure", which means there is a packet not being captured by any measuring device, is preventable in the packet capture system in which a plurality of measuring devices capture packets in turn. That is, the capturing operation in FIG. 1 enables the realization of the full capture.

As clearly understood from the description above, the capturing operation in FIG. 1 requires no time synchronization among the measuring devices A through C. Even if the measuring devices A through C are not provided with a clock that indicates time, the full capture is still guaranteed in the capturing operation in FIG. 1.

For example, assume a comparative example in which time synchronization is performed among a plurality of measuring devices and a time schedule for the measuring time period of each measuring device is predetermined so that two adjacent measuring time periods overlap each other for a length depending on the accuracy of the synchronization. The method in FIG. 1 is advantageous over this comparative example in the following points.

Even if the time synchronization is performed once, differences among the clocks of the measuring devices occur sometime. Therefore, it is necessary in the comparative example to repeatedly perform the time synchronization. However, in the method in FIG. 1, it is unnecessary to perform the time synchronization. In addition, in the comparative example, it is necessary to check in advance the accuracy of the synchronization.

Furthermore, in the comparative example, when a change in the measuring device with time, a change in environment, etc. affect the accuracy of the synchronization, the range of the overlap may need to be set large in order to prevent a capture failure. As a result, an unnecessarily large load may be imposed on the measuring device. On the other hand, in the method in FIG. 1, if one or more packets that is/are determined depending on the duplicate packet condition is/are double captured by two measuring devices corresponding to two adjacent measuring time periods, this situation alone is sufficient to allow the former of the two measuring devices to stop the capture. Therefore, an unnecessarily large load is not imposed on the measuring device if the stop criterion and the duplicate packet condition are appropriately defined.

The common capturing operation among the first through third embodiments and its merits are described above.

Next, an aggregating operation that is performed by an aggregation processing device provided in the packet capture system and that is performed after the aggregation processing device collects packets captured by a plurality of measuring devices is described below with reference to FIG. 2. As described later in detail, the aggregation processing device is a device capable of communicating with the measuring devices A through C. The aggregation processing device may be incorporated into any of the measuring devices A through C, or may be an external device independent of the measuring devices A through C.

Figure 2:
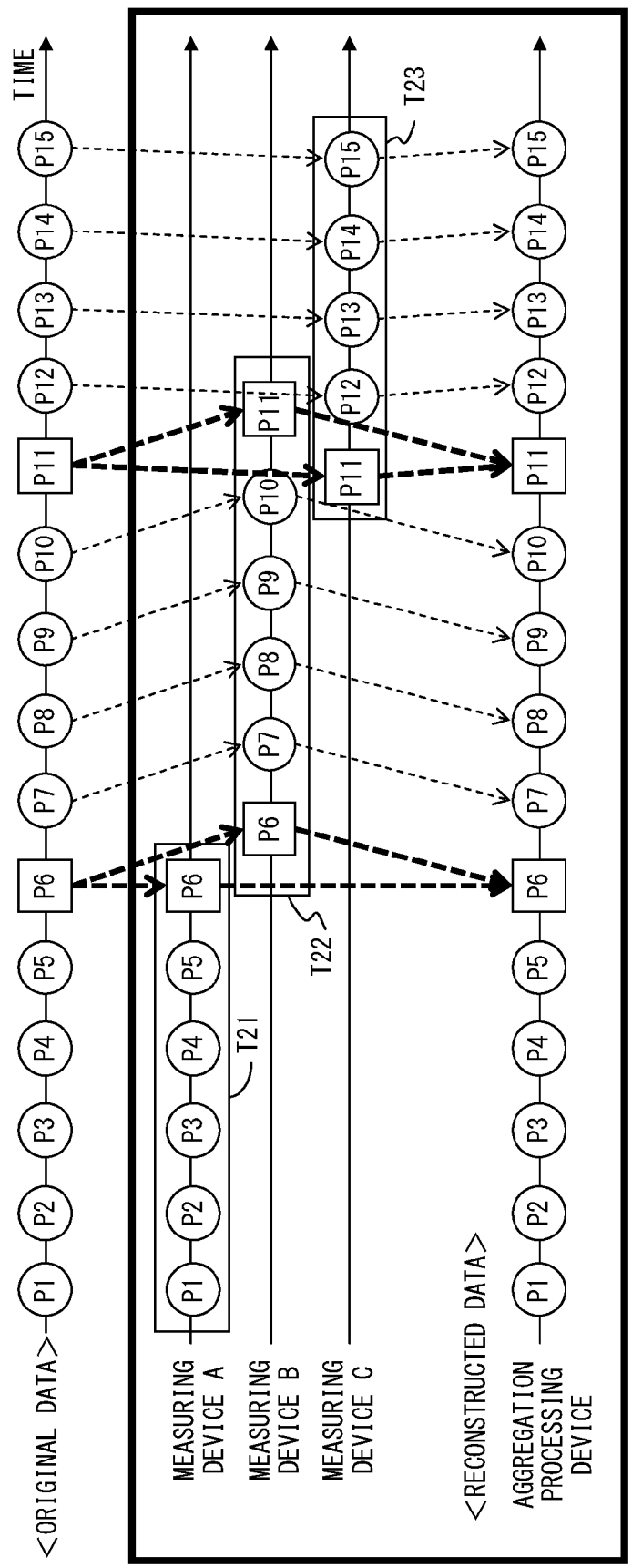
FIG. 2 is an explanatory view of a common aggregating operation among the first through third embodiments.

FIG. 2 is an explanatory view of a common aggregating operation among the first through third embodiments. The aggregating operation by the aggregation processing device includes the following two procedures.

The first procedure of the aggregating operation is a procedure to reconstruct a series of packets flowing on a network without duplication by identifying a duplicate packet(s) included in the collected packets. In the method in FIG. 1, there is no capture failure. Therefore, the aggregating operation in FIG. 2 enables the reconstruction of a series of packets without omission or duplication.

For example, fifteen packets P1 through P15 are illustrated as original data in FIG. 2. In the example in FIG. 2, the measuring device A captures the packets P1 through P6 in the measuring time period T21, the measuring device B captures the packets P6 through P11 in the measuring time period T22, and the measuring device C captures the packets P11 through P15 in the measuring time period T23.

Figure 14:
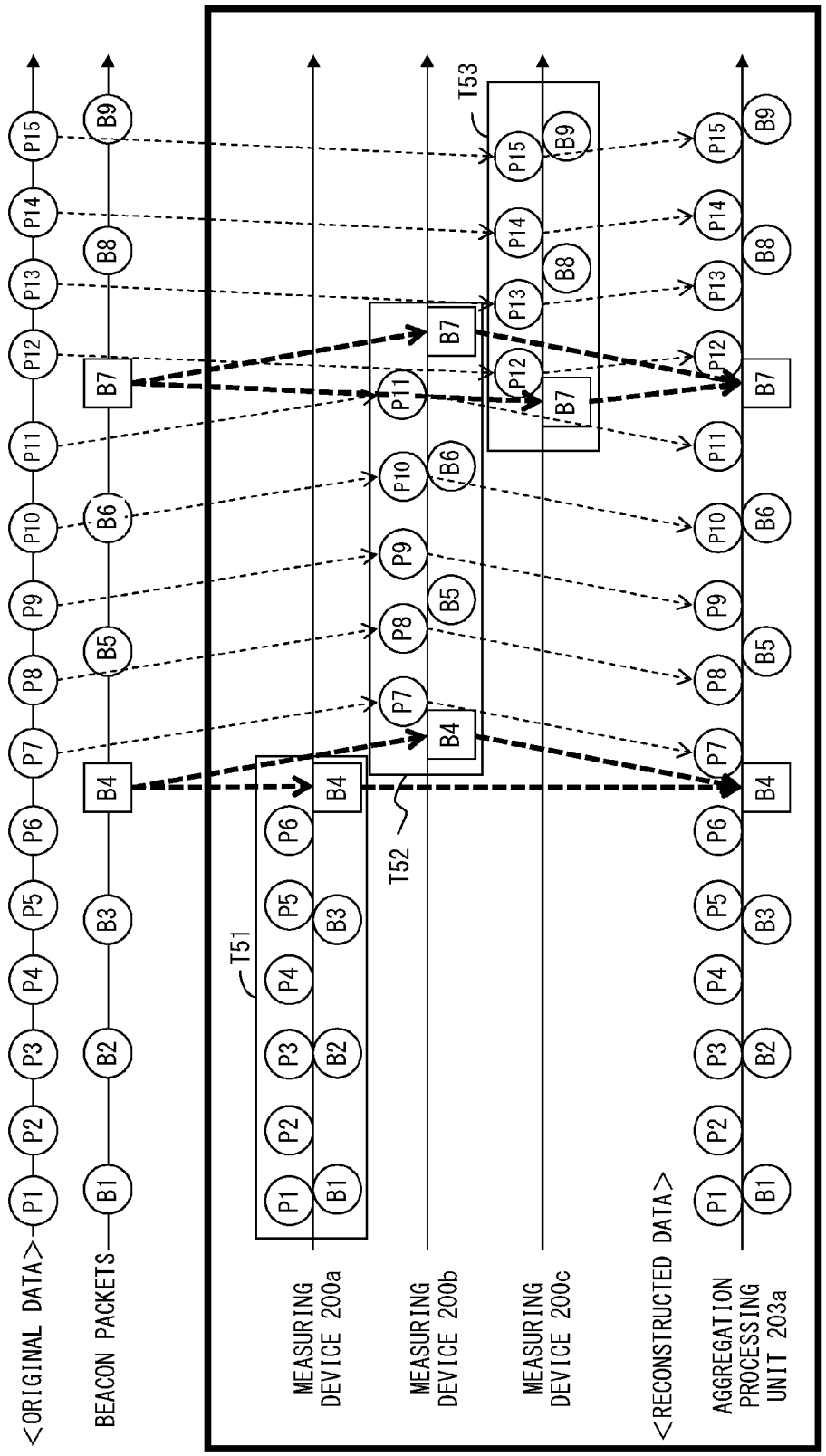
FIG. 14 is an explanatory view of an aggregating operation according to the third embodiment.

As illustrated in FIG. 2, the measuring time periods T21 and T22 overlap, and the packet P6 is a duplicate packet that is double captured by the measuring devices A and B. Similarly, the measuring time periods T22 and T23 overlap, and the packet P11 is a duplicate packet that is double captured by the measuring devices B and C. In FIG. 2 and FIG. 14, which is referred to later, a duplicate packet is illustrated as enclosed by a square, and each of other packets is illustrated as enclosed by a circle.

In the example in FIG. 2, the aggregation processing device collects six packets P1 through P6 from the measuring device A, collects six packets P6 through P11 from the measuring device B, and collects five packets P11 through P15 from the measuring device C. That is, the aggregation processing device collects a total of seventeen (17=6+6+5) packets.

Each measuring device stores a plurality of packets, while maintaining the order in which these plurality of packets were captured. Then, the aggregation processing device collects, in the captured order, the plurality of packets captured by each measuring device. Maintaining the order is achievable even if a clock indicating time is not provided in each measuring device.

In the first procedure of the aggregating operation, the aggregation processing device identifies that the packets P6 and P11 are duplicate packets. As the details are described later, the aggregation processing device may compare the information included in the packet headers of two packets in order to determine whether or not the two packets are identical.

After the second procedure that is described later, the aggregation processing device discards one of the two packets P6 collected double from both of the measuring devices A and B, and also discards one of the two packets P11 collected double from both of the measuring devices B and C. Discarding one of the duplicate packets enables the aggregation processing device to obtain a series of the fifteen packets P1 through P15 without duplication.

In addition, since the aggregation processing device collects packets while maintaining the order as mentioned above, the aggregation processing device recognizes the order among the packets P1 through P6, the order among the packets P6 through P11, and the order among the packets P11 through P15. Therefore, the aggregation processing device is also able to recognize the order among the fifteen packets P1 through P15 that are reconstructed without duplication.

As described above, even in the case in which the packets P1 through P15 are captured while the capturing operation is shared among a plurality of measuring devices, the packet capture system is capable of reconstructing the series of packets P1 through P15 with the order maintained and without omission or duplication. The reconstructed packets P1 through P15 may be stored in a storage device as an audit trail, for example, or may be outputted to a quality analysis system.

The second procedure of the aggregating operation is omissible, but may be performed, for example, in order to conduct quality control in a service (e.g., a VoIP service) that provides streaming data. Specifically, the second procedure may be conducted for a jitter analysis, for example.

The second procedure is performed when all of the following three conditions hold.

Each measuring device is provided with a clock indicating time.
Each measuring device stores each captured packet in association with its capture time.
The aggregation processing device collects not only a packet, but also its capture time.

The second procedure is specifically a procedure to adjust the capture time associated with each packet in the series of packets P1 through P15 that are reconstructed in the first procedure without omission or duplication, and to correct each capture time to the time indicated by a reference clock. The correction in the second procedure is based on the difference in capture time associated with the same duplicate packet by different two measuring devices.

For example, each of the packets P1 through P6 captured by the measuring device A is associated with its capture time expressed by the clock of the measuring device A. Similarly, each of the packets P6 through P11 captured by the measuring device B is associated with its capture time expressed by the clock of the measuring device B, and each of the packets P11 through P15 captured by the measuring device C is associated with its capture time expressed by the clock of the measuring device C.

A reference clock may be arbitrarily specified, and may be the clock of any of the measuring devices A through C, or a clock of another device. For convenience in the description below, the clock of the measuring device A is assumed to be a reference clock. Also for convenience in description, it is assumed that the clock of the measuring device B is 1 second ahead of the clock of the measuring device A, and that the clock of the measuring device C is 0.8 second behind the clock of the measuring device A.

In FIG. 2, each horizontal axis indicates a time axis expressing the time in each clock. Therefore, the horizontal positions of the same packet captured simultaneously by a plurality of measuring devices are illustrated in FIG. 2 so as to differ depending on the differences among the clocks of the measuring devices. For example, since the clock of the measuring device B is 1 second ahead of the clock of the measuring device A, the position of the packet P6 on the time axis of the measuring device B is right to the position of the packet P6 on the time axis of the measuring device A.

Since the reference clock is the clock of the measuring device A, it is not necessary to correct the capture time that the measuring device A has associated with each of the packets P1 through P6 captured by the measuring device A itself.

In addition, the aggregation processing device has identified the packet P6 as a duplicate packet in the first procedure. Therefore, based on the difference in capture time associated with the packet P6 by the measuring devices A and B, the aggregation processing device recognizes that the clock of the measuring device B is 1 second ahead of the clock of the measuring device A. Therefore, the aggregation processing device is able to correct the capture time of each of the packets P7 through P11 to the time indicated by the reference clock by subtracting 1 second from each capture time that the measuring device B has associated with each of the packets P7 through P11.

Similarly, the aggregation processing device has already identified that the packet P11 is a duplicate packet. Therefore, based on the difference in capture time associated with the packet P11 by the measuring devices B and C, the aggregation processing device is able to recognize that the clock of the measuring device C is 1.8 seconds behind the clock of the measuring device B. Therefore, the aggregation processing device is able to recognize that the clock of the measuring device C is 0.8 second behind the clock of the measuring device A based on the recognition that the clock of the measuring device B is 1 second ahead of the clock of the measuring device A.

As a result, the aggregation processing device is able to correct the capture time of each of the packets P12 through P15 to the time expressed by the reference clock by adding 0.8 second to each capture time that the measuring device C has associated with each of the packets P12 through P15.

By the second procedure described above, the capture time of each packet in the series of packets P1 through P15 without duplication or omission is adjusted and expressed by the same reference clock. Therefore, the use of the adjusted capture time enables a jitter analysis etc. on the packets captured over a plurality of measuring time periods.

Next, an example of the configuration of the packet capture system, which performs the common operation among the first through third embodiments as described above with reference to FIGS. 1 and 2, is described below with reference to FIG. 3. The packet capture system described above may be a forensic system for recording an audit trail or may be a quality control system for performing a jitter analysis etc. depending on the purpose of capturing packets. For convenience in explanation in the following description, a communication quality measurement system is mainly described below as an example of the packet capture system.

Figure 3:
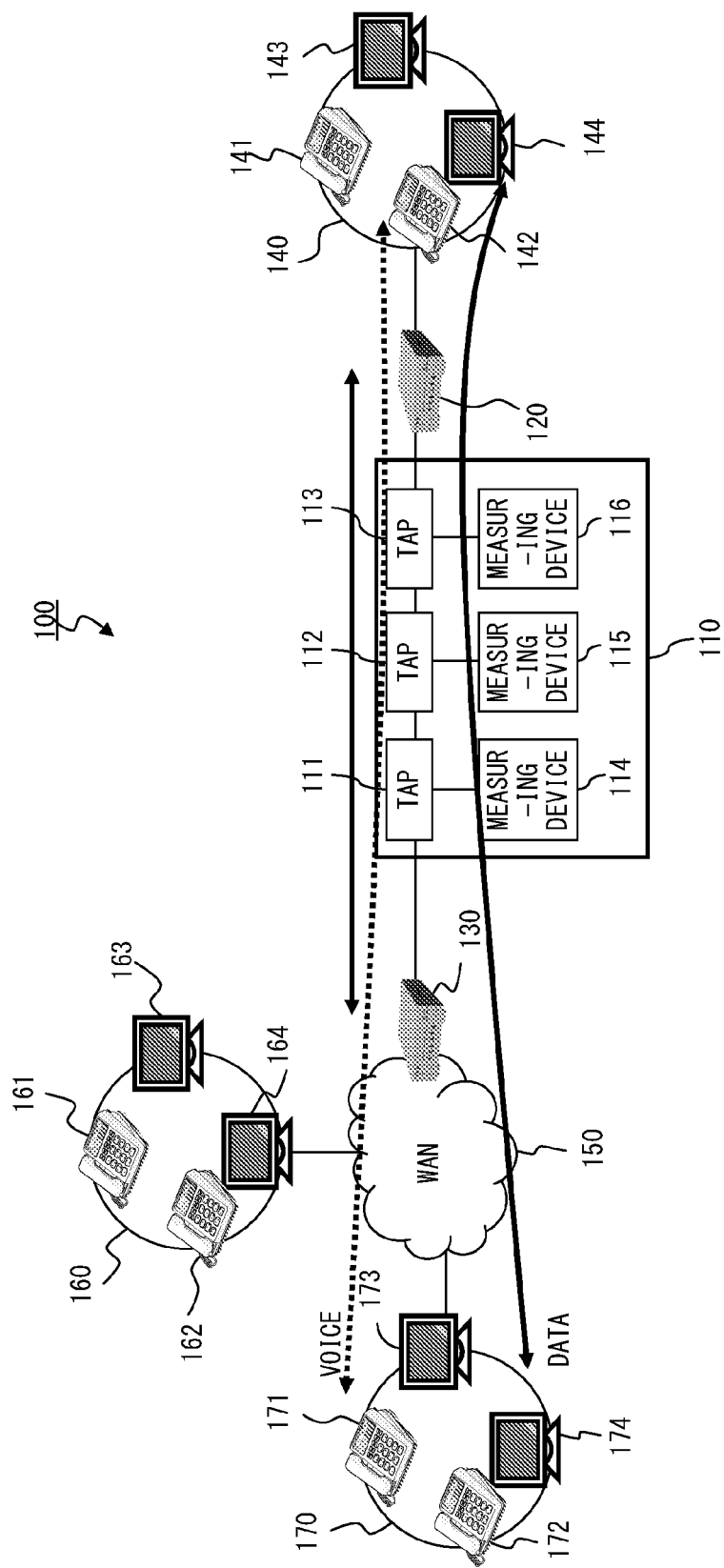
FIG. 3 is a configuration diagram illustrating an example of a network to which the first through third embodiments are applied.

FIG. 3 is a configuration diagram illustrating an example of a network to which the first through third embodiments are applied.

A communication quality measurement system 110 is provided at an observation point set in a network 100 illustrated in FIG. 3. The communication quality measurement system 110 observes the traffic at the observation point for the analysis and the control of the communication quality. The communication quality measurement system 110 includes taps 111, 112, and 113, and measuring devices 114, 115, and 116.

The observation point is located in the segment between routers 120 and 130. The router 120 is connected to a network 140. The network 140 is, for example, a LAN (local area network). FIG. 3 exemplifies the networks 140, 160, and 170 which are interconnected through a WAN (wide area network) 150 which is provided by an ISP (Internet service provider). The networks 160 and 170 are also, for example, LANs. The WAN 150 in FIG. 3 is a packet communication network for providing an IP telephony service over VoIP.

In the example in FIG. 3, the observation point is located between the WAN 150 and the network 140. Therefore, for convenience of illustration, in a plurality of routers included in the network 100, only the router 120, which connects the network 140 to the outside, and the router 130, which is provided on the WAN 150 side as opposite to the router 120, are illustrated. For example, a router that connects the WAN 150 and the network 160 is omitted in FIG. 3.

Telephones 141 and 142 with an IP telephony function and PCs (personal computers) 143 and 144 are connected to the network 140 through a switching hub etc. not illustrated in FIG. 3. Similarly, telephones 161 and 162 with an IP telephony function and PCs 163 and 164 are connected to the network 160 through a switching hub etc. not illustrated in FIG. 3. In addition, telephones 171 and 172 with an IP telephony function and PCs 173 and 174 are connected to the network 170 through a switching hub etc. not illustrated in FIG. 3.

The PCs 143, 144, 163, 164, 173, and 174 may have, for example, the IP telephony function, and/or may receive a streaming service from a streaming server not illustrated in FIG. 3 through the WAN 150.

In the communication quality measurement system 110 in the network 100 illustrated in FIG. 3 and configured as described above, the devices corresponding to "a plurality of measuring devices" described above with reference to FIGS. 1 and 2 are the measuring devices 114, 115, and 116. These measuring devices 114, 115, and 116 are connected, through the taps 111, 112, and 113, respectively, to a path that is to be monitored and that exists between the routers 120 and 130. Therefore, the measuring devices 114, 115, and 116 are able to capture, through the taps 111, 112, and 113, respective, a packet flowing on the path to be monitored.

Furthermore, the sharing control processing device and the aggregation processing device described above with reference to FIGS. 1 and 2 are provided in any of the measuring devices 114, 115, and 116 in the example in FIG. 3. As described later in detail, the function of each of the sharing control processing device, the aggregation processing device, and the measuring device which are described above with reference to FIGS. 1 and 2 are realizable by a program. Therefore, a configuration in which any measuring device also operates as a sharing control processing device and an aggregation processing device enables reduction in the number of devices included in the communication quality measurement system 110, and thereby enables downsizing of the communication quality measurement system 110.

The common points among the first through third embodiments are described above with reference to FIGS. 1 through 3.

Then, the first embodiment is described below with reference to FIGS. 4 through 8.

Figure 4:
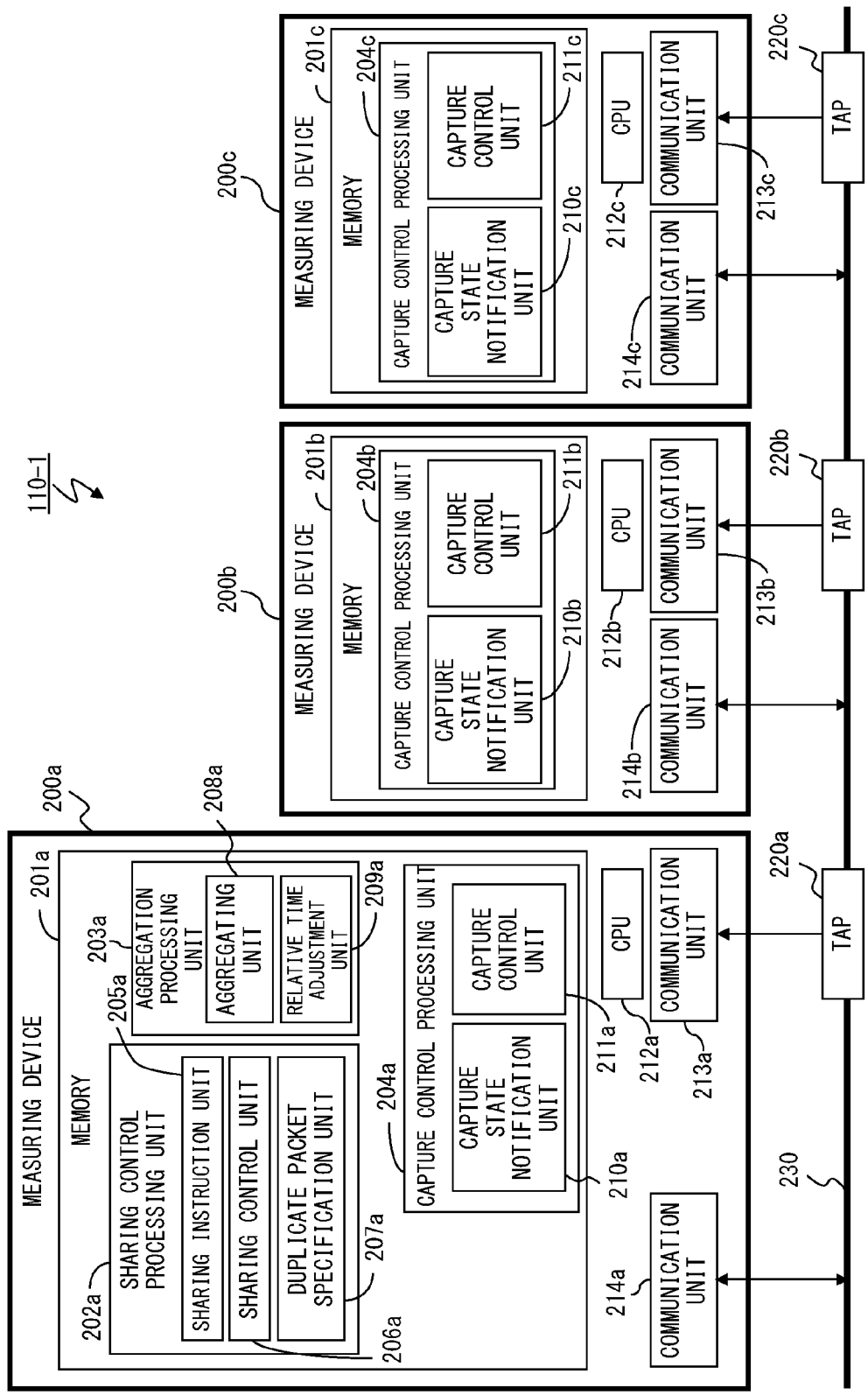
FIG. 4 is a configuration diagram of a communication quality measurement system according to the first embodiment.

FIG. 4 is a configuration diagram of a communication quality measurement system according to the first embodiment. A communication quality measurement system 110-1 in FIG. 4 is a specific example of the communication quality measurement system 110 in FIG. 3.

The communication quality measurement system 110-1 includes measuring devices 200a, 200b, and 200c which are specific examples of the measuring devices 114, 115, and 116 in FIG. 3. The communication quality measurement system 110-1 includes taps 220a, 220b, and 220c which are specific examples of the taps 111, 112, and 113 in FIG. 3. The monitor target path between the routers 120 and 130 illustrated in FIG. 3 is illustrated as a monitor target path 230 in FIG. 4. In the first embodiment, the measuring device 200a also operates as the sharing control processing device and the aggregation processing device described above with reference to FIGS. 1 and 2.

The measuring device 200a includes rewritable non-transitory memory 201a such as RAM (random access memory) etc. A program (or programs) for realizing the functions of a sharing control processing unit 202a, an aggregation processing unit 203a, and a capture control processing unit 204a is(are) loaded into the memory 201a.

The sharing control processing unit 202a provides a function similar to that of the sharing control processing device described above with reference to FIG. 1. The aggregation processing unit 203a provides a function similar to that of the aggregation processing device described above with reference to FIG. 2. The capture control processing unit 204a controls the capture of a packet(s) performed by the measuring device 200a.

In the first embodiment, the sharing control processing unit 202a includes a sharing instruction unit 205a, a sharing control unit 206a and a duplicate packet specification unit 207a. The aggregation processing unit 203a includes an aggregating unit 208a and a relative time adjustment unit 209a. The capture control processing unit 204a includes a capture state notification unit 210a and a capture control unit 211a. These units provided in the sharing control processing unit 202a, the aggregation processing unit 203a, and the capture control processing unit 204a are described later in detail with reference to FIGS. 5 through 7.

The measuring device 200a further includes a CPU (central processing unit) 212a that realizes the functions of the sharing control processing unit 202a, the aggregation processing unit 203a, and the capture control processing unit 204a by executing the program(s) loaded into the memory 201a.

In addition, the measuring device 200a includes a communication unit 213a that is connected to the tap 220a, and a communication unit 214a that is connected to the monitor target path 230 but not through the tap 220a. For example, the communication units 213a and 214a may be realized by two physical communication ports and a device driver for providing an interface of the communication through each communication port.

The measuring device 200b is similar to the measuring device 200a in that it includes a memory 201b and in that a program for realizing the function of a capture control processing unit 204b is loaded into the memory 201b. Like the capture control processing unit 204a, the capture control processing unit 204b includes a capture state notification unit 210b and a capture control unit 211b.

Furthermore, the measuring device 200b includes a CPU 212b that realizes the function of the capture control processing unit 204b by executing the program loaded into the memory 201b. Furthermore, the measuring device 200b also includes a communication unit 213b that is connected to the tap 220b, and a communication unit 214b that is connected to the monitor target path 230 but not through the tap 220b.

Since the measuring device 200c is similar in configuration to the measuring device 200b, the detailed description of the measuring device 200c is omitted here.

Each of the measuring devices 200a, 200b, and 200c described above may be realized by dedicated equipment, or may be realized by a general-purpose computer. In addition, each of the functions of the sharing control processing unit 202a, the aggregation processing unit 203a, and the capture control processing units 204a, 204b, and 204c may be realized not by a program, but by a hardware circuit. The program for realizing the function of each unit may be stored in a computer-readable non-transitory storage medium such as a magnetic disk, an optical disk, etc., and may be read from the storage medium to each of the measuring devices 200a, 200b, and 200c.

In FIG. 4, the measuring devices 200a, 200b, and 200c are connected to the monitor target path 230 through the taps 220a, 220b, and 220c, respectively, which are inserted into the monitor target path 230. Therefore, the measuring devices 200a, 200b, and 200c are enabled to capture, through the taps 220a, 220b, and 220c, respectively, a packet flowing between the routers 120 and 130 in FIG. 3 through the monitor target path 230.

The taps 220a, 220b, and 220c according to the present embodiment are ordinary network taps without the function of data injection. That is, it is not feasible to transmit data from the communication units 213a, 213b, and 213c to the monitor target path 230 respectively through the taps 220a, 220b, and 220c.

However, the capturing operation in FIG. 1 is based on an assumption that each measuring device is able to communicate with the sharing control processing device. That is, according to the present embodiment, it is assumed that there is a communication path among the measuring devices 200a, 200b, and 200c.

The present embodiment is an example of using the monitor target path 230 as the above-assumed communication path among the measuring devices 200a, 200b, and 200c. Therefore, the measuring devices 200a, 200b, and 200c are connected to the monitor target path 230 respectively through the communication units 214a, 214b, and 214c. As a result, data transmission from the measuring devices 200a, 200b, and 200c to the monitor target path 230 is enabled, and the above-assumed communication path is established among the measuring devices 200a, 200b, and 200c.

Since the connection paths to the monitor target path 230 from the measuring devices 200a, 200b, and 200c respectively through the communication units 214a, 214b, and 214c may be arbitrarily configured, the details of them are omitted in FIG. 4. For example, three hubs not illustrated in the drawings may be provided at any points on the monitor target path 230, which is illustrated in FIG. 4 and exists between the routers 120 and 130 in FIG. 3, and the three hubs may be connected to the communication units 214a, 214b, and 214c through the respective cables.

The taps 220a, 220b, and 220c may be those configured to output a packet flowing from the router 120 to the router 130 on the monitor target path 230 and a packet flowing on the monitor target path 230 in the opposite direction collectively from one physical port. In this case, each of the communication units 213a, 213b, and 213c may be realized by one physical port.

Otherwise, the taps 220a, 220b, and 220c may be those configured to output a packet flowing from the router 120 to the router 130 on the monitor target path 230 and a packet flowing on the monitor target path 230 in the opposite direction separately from two ports. In this case, two physical ports realize each of the communication units 213a, 213b, and 213c.

The capture control processing units 204a, 204b, and 204c may further perform control to discard a certain packet (hereafter referred to as a "management packet") in the packets incoming through the communication units 213a, 213b, and 213c. The management packet is a packet for communications among the measuring devices 200a, 200b, and 200c. The reason why the management packet is discarded is because the management packet is also received by the communication units 214a, 214b, and 214c.

Whether or not a packet is a management packet is determinable by, for example, whether or not at least one of the source and the destination of the packet concerned is any of the measuring devices 200a, 200b, and 200c.

Otherwise, when only IP is used as the protocol in the network layer for the communication between the routers 120 and 130 in FIG. 3, another embodiment is also feasible in which a protocol other than IP is used (e.g., IPX (Internetwork Packet Exchange) is used) for the communication of a management packet. In this case, the capture control processing units 204a, 204b, and 204c may control the capturing operation of the measuring devices 200a, 200b, and 200c so that the IPX packet is discarded and only the IP packet is to be captured.

The configuration of the communication quality measurement system 110-1 in the first embodiment is described above with reference to FIG. 4.

Figure 5:
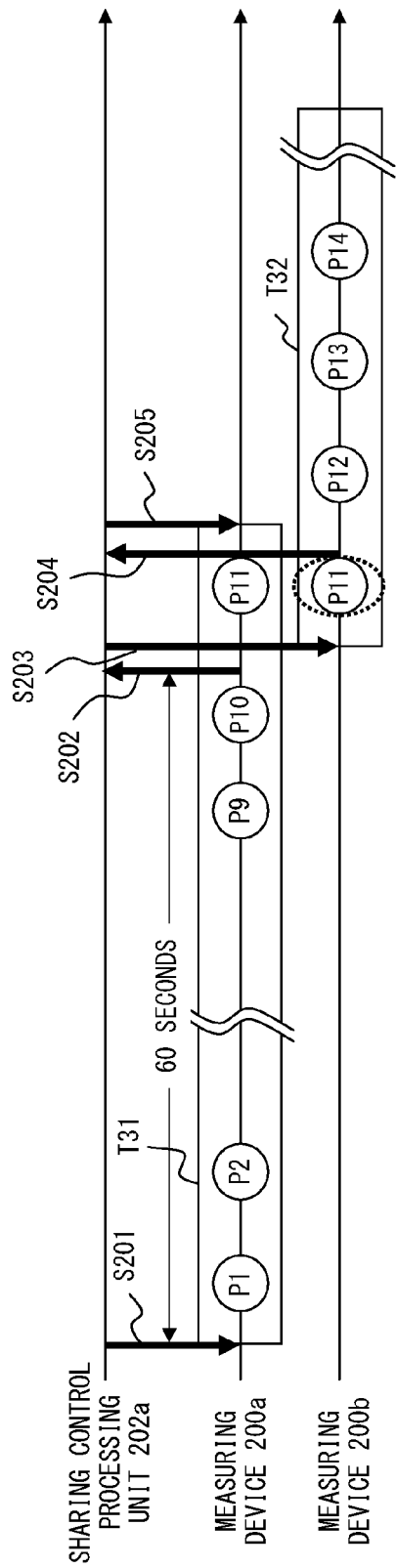
FIG. 5 is an explanatory view of a capturing operation according to the first embodiment.

Next, the operation of each unit in the communication quality measurement system 110-1 is described below with reference to FIGS. 5 through 8. FIGS. 5 and 6 correspond to a specific example of FIG. 1, and FIG. 7 corresponds to a specific example of FIG. 2.

FIG. 5 is an explanatory view of the capturing operation according to the first embodiment. In the first embodiment, the sharing control rule, which is explained with reference to FIG. 1, is a rule that statically defines the order in which the capture is shared among the plurality of the measuring devices 200a, 200b, and 200c. In addition, the stop criterion and the duplicate packet condition, which are described with reference to FIG. 1, are also predefined statically according to the first embodiment.

A sharing order statically defined as the sharing control rule and the stop criterion are set in the sharing control unit 206a. The duplicate packet condition is set in the duplicate packet specification unit 207a.

For example, the sharing order and the stop criterion may be inputted to the sharing control unit 206a through an input device not illustrated in the attached drawings, and the duplicate packet condition may also be inputted to the duplicate packet specification unit 207a through the input device not illustrated in the attached drawings. Otherwise, the stop criterion and the duplicate packet condition may be recorded in advance in a non-volatile memory device, which is provided in the measuring device 200a but which is not illustrated in the attached drawings, and may be read to the sharing control unit 206a and the duplicate packet specification unit 207a, respectively.

The items (1a) through (1g) listed below are examples of the combinations of the sharing order, the stop criterion, and the duplicate packet condition.

(1a) example in which the sharing order, the stop criterion, and the duplicate packet condition are uniform
(1b) example in which the stop criterion is not uniform
(1c) example in which the sharing order is not uniform
(1d) example in which the number of duplicate packet(s) in the duplicate packet condition is larger than one
(1e) example in which a packet to be counted as a duplicate packet is limited by the duplicate packet condition
(1f) example in which a packet to be counted as a duplicate packet is more limited by the duplicate packet condition than in the example of (1e)
(1g) example in which a packet to be counted as a duplicate packet is more limited by the duplicate packet condition than in the example of (1f)

The examples of (1a) through (1g) are described below further in detail.

In the example of (1a) above, the sharing order is the repetition of "the measuring device 200a→the measuring device 200b→the measuring device 200c→the measuring device 200a→the measuring device 200b→the measuring device 200c→ . . . ". That is, the sharing order is defined by a repetitive pattern in which all the measuring devices 200a, 200b, and 200c equally appear at the same frequency.

In addition, in the example of (1a), the stop criterion is the condition that a period of 60 seconds during which the capture is continued has passed after the start of the capture. The value "60 seconds" is merely the value for convenience of explanation. It is preferable to define, based on a preliminary experiment etc., the stop criterion using an appropriate value that is suitable for the capability of the measuring devices 200a, 200b, and 200c.

The "capability" above refers to the total processing performance depending on, for example, the following factors.
 Capacity of the memories 201a, 201b, and 201c, which are available as buffers for temporarily storing packets captured through the communication units 213a, 213b, and 213c, respectively
 Clock speed (i.e., clock rate) of the CPUs 212a, 212b, and 212c
 Communication speed of the communication units 213a, 213b, and 213c Then, in the example of (1a), the duplicate packet condition is that the number of packet(s) actually captured after starting the capture has reached one. This duplicate packet condition does not depend on the type of packet. That is, this duplicate packet condition is that one packet has been actually captured regardless of the attribute of the packet. Therefore, the duplicate packet condition in the example of (1a) is simply expressed as "one", which is the number of duplicate packet(s).

The example of (1a) described above is preferable when there is not a large difference in capability among the measuring devices 200a, 200b, and 200c.

Described next is the example of (1b), in which the stop criterion is not uniform. In the example of (1b), the sharing order and the duplicate packet condition are uniform as in the example of (1a). On the other hand, the stop criterion is defined depending on the capability (i.e., performance) of the measuring devices 200a, 200b, and 200c.

For example, assume that the performance of the measuring device 200a is the highest, and that the performance of the measuring device 200c is the lowest. In this case, the stop criterion for the measuring device 200a is, for example, that a period of 60 seconds during which the capture is continued has passed after the start of the capture. The stop criterion for the measuring device 200b is, for example, that a period of 30 seconds during which the capture is continued has passed after the start of the capture. The stop criterion for the measuring device 200c is, for example, that a period of 10 seconds during which the capture is continued has passed after the start of the capture.

That is, in the example of (1b), the higher performance a measuring device has, the longer time is used to define the stop criterion to be applied to the measuring device. Therefore, even when a plurality of measuring devices are different in capability, an appropriate and efficient sharing, which depends on the capability of each measuring device, is realized by checking in advance the capability of each measuring device based on a preliminary experiment etc., and by determining the stop criterion for each measuring device based on the checking result.

Described next is the example of (1c), in which the sharing order is not uniform. In the example of (1c), the stop criterion and the duplicate packet condition are uniform as with the example of (1a). However, the sharing order is determined depending on the performance of the measuring devices 200a, 200b, and 200c.

For example, assume that the performance of the measuring device 200a is the highest, and that the measuring devices 200b and 200c are almost equal in performance. In this case, the sharing order is, for example, "the measuring device 200a→the measuring device 200b→the measuring device 200a→the measuring device 200c→the measuring device 200a→the measuring device 200b→the measuring device 200a→the measuring device 200c→ . . . ".

That is, in the example of (1c), the sharing order is defined with a repetitive pattern in which a measuring device having higher capability occurs at a higher frequency. Therefore, even when a plurality of measuring devices are different in capability, an appropriate and efficient sharing, which depends on the capability of each measuring device, is realized by checking in advance the capability of each measuring device based on a preliminary experiment etc., and by determining a repetitive pattern of the sharing order based on the checking result.

Described next is the example of (1d), in which the number of duplicate packet(s) in the duplicate packet condition is larger than one. In the example of (1d), the sharing order and the stop criterion are similar to those in the example of (1a).

The duplicate packet condition is that the number of packets actually captured after the start of the capture has reached ten. That is, the example of (1d) is an example in which the number of duplicate packets is "ten".

Since the explanation in FIG. 1 is applicable to the first embodiment, the full capture is realized according to the first embodiment. However, the possibility that a capture failure occurs due to any problem which may arises at a very low probability is not completely zero. The example of (1d) has an effect of further reducing the possibility of the capture failure, which may arise but is very rare, than in the example of (1a) above.

Described next is the example of (1e), in which a packet to be counted as a duplicate packet is limited by the duplicate packet condition.

In the example of (1e), the sharing order may be defined by a uniform repetitive pattern as in the example of (1a). Otherwise, the sharing order may be defined by a repetitive pattern in which each of the measuring devices 200a, 200b, and 200c occurs at a frequency depending on its capability as in the example of (1c).

In the example of (1e), as in the example of (1a), a uniform stop criterion may be applied to all the measuring devices 200a, 200b, and 200c. Otherwise, as in the example of (1b), the stop criterion depending on the capability may be applied to each of the measuring devices 200a, 200b, and 200c.

The duplicate packet condition in the example of (1e) is that the number of user packet(s) in the packet(s) actually captured after the start of the capture has reached one.

That is, the duplicate packet condition in the example of (1e) is an example of the condition that the counted number of packet(s) has reached a predetermined threshold when counting only packet(s) of a pre-specified particular attribute in the actually captured packet(s). In the example of (1e), the "particular attribute" is "being a user packet", and the "predetermined threshold" is "one".

A user packet is a packet transmitted from application software to a network. To be more specific, the user packet according to the present embodiment is a packet other than a management packet among packets transmitted in the communication quality measurement system 110-1.

In the above-mentioned duplicate packet condition, since the condition of further restricting the type of user packet is not included, an arbitrary IP packet that the router 120 or 130 allows to flow on the monitor target path 230 is counted as a user packet.

Described next is the example of (1f), in which a packet to be counted as a duplicate packet is more limited by the duplicate packet condition than in the example of (1e).

In the example (1f), the sharing order and the stop criterion are similar to those in the example of (1e). The duplicate packet condition herein is one that is further restricted than the duplicate packet condition in the example of (1e). The duplicate packet condition in the example of (1f) corresponds to a case in which the "particular attribute" and the "predetermined threshold", which are explained with reference to the example of (1e), are "being a user packet of RTP (Real-time Transport Protocol)" and "one", respectively.

Described next is the example of (1g), in which a packet to be counted as a duplicate packet is more limited by the duplicate packet condition than in the example of (1f).

In the example of (1g), the sharing order and the stop criterion are similar to those in the example of (1e). The duplicate packet condition herein is one that is further restricted than the duplicate packet condition in the example of (1f). In the example of (1g), the above-mentioned "particular attribute" may be, for example, an attribute of "being a user packet which is an RTP packet, whose source IP address is 10.25.123.33, and whose source port number is 20000".

The source IP address is included in the IP header as described later with reference to FIG. 8. The RTP packet is included in the data payload of the UDP (User Datagram Protocol) packet included in the data payload of the IP packet. The source port number is included in the UDP header. Each of the capture control processing units 204a, 204b, and 204c is able to determine whether the duplicate packet condition as in the examples of (1e) through (1g) is satisfied or not by analyzing the protocol header of each layer encapsulated and included in the captured packet.

The duplicate packet condition as in the examples of (1e) through (1g) is effective in more surely preventing the capture failure (whose probability is very low even if it should occur) so that the prevention is implemented in a way suitable for the purpose of the capture. For example, when the purpose of the capture is to control the quality of a service provided through RTP, the problem of failing to capture an RTP packet is more serious than the problem of failing to capture a packet of the type other than the RTP packet. Therefore, it is useful to define the duplicate packet condition so that any packet having an attribute regarded as important depending on the purpose of the capture is surely included (for example, any RTP packet is surely included) in duplicate packets.

The combinations of the sharing order, the stop criterion, and the duplicate packet condition are described above with reference to the examples of (1a) through (1g), but it is obvious that various other combinations are also available.

Next, FIG. 5 is described, and the case of (1a) is assumed below as an example for convenience of explanation. That is, the sharing order specifically defined by the repetitive pattern of "the measuring device 200a→the measuring device 200b→the measuring device 200c→the measuring device 200a→the measuring device 200b→the measuring device 200c→ . . . " is set in the sharing control unit 206a as the sharing control rule. The condition "a period of 60 seconds during which the capture is continued has passed after the start of the capture" is set in the sharing control unit 206a as the stop criterion. Furthermore, the condition "the number of packet(s) actually captured after the start of the capture has reached one" is set in the duplicate packet specification unit 207a as the duplicate packet condition.

First, before step S201 in FIG. 5, the following process is performed in advance. The sharing control unit 206a notifies both of the measuring devices 200b and 200c of the stop criterion through the communication unit 214a and the monitor target path 230. The notified stop criterion is received by each of the communication units 214b and 214c, and recognized by each of the capture state notification units 210b and 210c. The sharing control unit 206a also notifies the capture state notification unit 210a, which is within the same measuring device 200a, of the stop criterion, and then the capture state notification unit 210a recognizes the stop criterion.

Furthermore, the duplicate packet specification unit 207a notifies both of the measuring devices 200b and 200c of the duplicate packet condition through the communication unit 214a and the monitor target path 230. The notified duplicate packet condition is received by each of the communication units 214b and 214c, and recognized by each of the capture state notification units 210b and 210c. The duplicate packet specification unit 207a also notifies the capture state notification unit 210a, which is within the same measuring device 200a, of the duplicate packet condition, and then the capture state notification unit 210a recognizes the duplicate packet condition.

Upon completion of the above-described preparation, then in step S201, the sharing control unit 206a, which is provided in the sharing control processing unit 202a and which serves as the sharing control processing device in FIG. 1, determines, based on the sharing order being set, that the measuring device for first capturing packets is the measuring device 200a. Then, the sharing control unit 206a instructs the sharing instruction unit 205a to instruct the measuring device 200a (to be more specific, the capture control unit 211a) to start the capture.

Then, at the instruction from the sharing control unit 206a, the sharing instruction unit 205a instructs the capture control unit 211a in the measuring device 200a to start the capturing operation. The capture control unit 211a has a control function to switch between performing and not performing the capture, and controls starting the capturing operation at the instruction. The measuring time period T31 in FIG. 5 starts from a time point at which the measuring device 200a starts the capturing operation.

As the control for starting the capturing operation, the capture control unit 211a performs control over a packet(s) incoming from the tap 220a through the communication unit 213a so as not to discard the packet(s) but to store the packet(s) in the memory 201a or another storage device not illustrated in the attached drawings. To be more specific, according to the present embodiment, the capture control unit 211a performs control to store captured packets while maintaining the order in which the packets are captured and associating each captured packet with its capture time.

In the measuring time period T31, the capture state notification unit 210a keeps monitoring the state of the capturing operation, and specifically monitors whether or not the stop criterion is satisfied. FIG. 5 illustrates that ten packets P1 through P10 are captured by the measuring device 200a in 60 seconds from the starting point of the measuring time period T31. FIG. 5 also illustrates that 60 seconds from the starting point of the measuring time period T31 have elapsed immediately after the measuring device 200a captures the packet P10.

Thus, in step S202, when 60 seconds have passed from the starting point of the measuring time period T31, the capture state notification unit 210a recognizes that the stop criterion has been satisfied, and notifies the sharing control unit 206a that the stop criterion has been satisfied. The notification that the stop criterion has been satisfied is also a notification that the measuring device 200a now plans to stop the capture.

Then, upon receipt of the notification in step S202, the sharing control unit 206a determines, in step S203, that the capture is to be handed over from the measuring device 200a to the measuring device 200b. That is, when the notification in step S202 is received, the sharing control unit 206a determines the measuring device 200b as the measuring device for next performing the capture according to the sharing control rule defined by the sharing order.

Furthermore in step S203, according to the determination by the sharing control unit 206a, the sharing instruction unit 205a instructs the capture control unit 211b in the measuring device 200b to start the capture. This instruction is issued through the communication unit 214a, the monitor target path 230, and the communication unit 214b.

Upon receipt of the instruction, the capture control unit 211b in the measuring device 200b performs control to start the capturing operation as with the capture control unit 211a in step S201. The measuring time period T32 in FIG. 5 starts from a time point at which the measuring device 200b starts the capturing operation.

In the measuring time period T32, the capture state notification unit 210b keeps monitoring the state of the capturing operation, and specifically monitors whether or not the duplicate packet condition and the stop criterion are satisfied.

Then, when a packet P11 flows on the monitor target path 230, the packet P11 is captured by both of the measuring devices 200a and 200b. Then, the duplicate packet condition is satisfied because the measuring device 200b actually captures one packet after starting the capture. The capture state notification unit 210b is able to recognize the satisfaction of the duplicate packet condition by counting the number of packet(s) captured by the measuring device 200b from the starting point of the measuring time period T32.

Then, in step S204, the capture state notification unit 210b notifies the sharing control unit 206a, through the communication unit 214b, the monitor target path 230, and the communication unit 214a, that the duplicate packet condition has been satisfied.

Upon receipt of the notification, the sharing control unit 206a determines in step S205 that the capture by the measuring device 200a is to be stopped. According to the determination by the sharing control unit 206a, the sharing instruction unit 205a instructs the capture control unit 211a in the measuring device 200a to stop the capture.

Then, the capture control unit 211a performs control to stop the capture, and the measuring device 200a stops the capture, thereby terminating the measuring time period T31. As described above, since the measuring device 200a continues the capture even after the stop criterion is satisfied in step S202, the measuring device 200a captures the packet P11. That is, the packet P11 is double captured by both of the measuring devices 200a and 200b.

After step S205, the measuring device 200b keeps capturing packets P12, P13, P14, etc. When 60 seconds have passed from the starting point of the measuring time period T32, the capture state notification unit 210b in the measuring device 200b notifies the sharing control unit 206a in the sharing control processing unit 202a that the capture is planned to be stopped.

In the above explanation for FIG. 5, a case is described in which the notification of the stop criterion and the duplicate packet condition is issued to the measuring devices 200a, 200b, and 200c before step S201. However, instead of the preliminary notification, the sharing control unit 206a may issue the notification of the stop criterion and the duplicate packet condition when respectively instructing the capture control units 211a, 211b, and 211c in the measuring devices 200a, 200b, and 200c to start the capture. By doing this, a variable stop criterion or a variable duplicate packet condition is made available.

Described below is an example of (1h) in which the settings include a variable duplicate packet condition. That is, the example of (1h) is one in which the number of duplicate packet(s) in the duplicate packet condition is variable. In the example of (1h), the sharing order and the stop criterion are similar to those of the example of (1a).

In the examples of (1a) and (1d), the fixed numbers "one" and "ten" of duplicate packet(s) define the duplicate packet condition, respectively. However, in the example of (1h), the variable number of duplicate packet(s) defines the duplicate packet condition. Specifically, the duplicate packet condition may be variable depending on the load state of a measuring device that is capturing packets. More specifically, the load state herein is one observed when the measuring device satisfies the stop criterion.

For example, the number of duplicate packet(s) may be defined as follows.

The number of duplicate packet(s) is fifteen if the CPU usage percentage of the measuring device at a time point when the stop criterion is satisfied is smaller than 10%.

The number of duplicate packet(s) is ten if the above mentioned CPU usage percentage is equal to or exceeds 10% and is smaller than 20%.

The number of duplicate packet(s) is five if the above mentioned CPU usage percentage is equal to or exceeds 20% and is smaller than 50%.

The number of duplicate packet(s) is two if the above mentioned CPU usage percentage is equal to or exceeds 50% and is smaller than 80%.

The number of duplicate packet(s) is one if the above mentioned CPU usage percentage is equal to or exceeds 80%.

A certain effect is achievable by thus defining the number of duplicate packet(s), i.e., by defining the number of duplicate packet(s) so that the higher the load is, the smaller the number of duplicate packet(s) is. The effect is one in which the loss (i.e., capture failure) of a duplicate packet(s) is prevented more surely depending on the margin level when there is a margin of the resources in the measuring device.

The capturing operation described above with reference to FIG. 5 is further explained below with reference to FIG. 6.

FIG. 6 is a flowchart of the capturing operation according to the first embodiment.

In step S301, the sharing control processing unit 202a acquires sharing settings. As described above with reference to FIG. 5, the sharing settings of (1a) through (1h), and various other settings may be available. For convenience of explanation, it is assumed that the sharing settings of (1a) are used. In the example of (1a) above, the sharing settings acquired by the sharing control processing unit 202a in step S301 are indicated by the combination of the following three.

the measuring time (i.e., the time during which the capture is continued) for each individual measuring device for defining the stop criterion the statically determined sharing order as a specific example of the sharing control rule the number of duplicate packet(s) for defining the duplicate packet condition To be more specific, the measuring time and the sharing order are acquired by the sharing control unit 206a, and the number of duplicate packet(s) is acquired by the duplicate packet specification unit 207a.

Next, in step S302, the sharing control processing unit 202a instructs the first measuring device to start the measurement, according to the sharing order. That is, according to the sharing order, the sharing control unit 206a in the sharing control processing unit 202a determines the measuring device for first performing the capturing operation. According to the determination, the sharing instruction unit 205a instructs the first measuring device to start the capturing operation. In the example in FIG. 5, the first measuring device is the measuring device 200a.

Upon receipt of the instruction, the first measuring device starts the measurement (i.e., packet capture) in step S303. For example, in the measuring device 200a as the first measuring device, the capture control unit 211a performs control to start the capture, and thereby the measuring device 200a starts the capturing operation. Steps S302 and S303 correspond to step S201 in FIG. 5.

In the next step S304, it is judged whether or not the measuring time has passed in the measuring device currently in measurement.

For example, in the measuring time period T31 in FIG. 5, the "measuring device currently in measurement" is the measuring device 200a. Therefore, the capture state notification unit 210a of the measuring device 200a monitors, in step S304, whether the measuring time (e.g., that of 60 seconds) has passed and thereby the stop criterion has been satisfied or not.

If the measuring time has not passed, the monitoring in step S304 is repeated. If the measuring time has passed, the capture state notification unit in the measuring device currently in measurement (for example, the capture state notification unit 210a in the measuring device 200a) notifies the sharing control unit 206a in the sharing control processing unit 202a that the capture is planned to be stopped, and control is passed to step S305. The transition from step S304 to step S305 corresponds to step S202 in FIG. 5.

Then, in step S305, the sharing control processing unit 202a instructs the next measuring device to start measurement, according to the sharing order. For example, in the example in FIG. 5, the sharing control unit 206a in the sharing control processing unit 202a determines the measuring device 200b as the "next measuring device" according to the sharing order, and the sharing instruction unit 205a instructs the measuring device 200b to start the capture according to the determination.

Then in step S306, the "next measuring device" starts measurement. For example, in the example in FIG. 5, in the measuring device 200b selected as the "next measuring device", the capture control unit 211b performs control to start the packet capture and thereby the measuring device 200b starts the packet capture. Steps S305 and S306 correspond to step S203 in FIG. 5.

In the next step S307, it is judged whether or not the "next measuring device" has acquired the IP packet(s) as many as the "number of duplicate packet(s)". Until the "next measuring device" acquires the IP packet(s) as many as the "number of duplicate packet(s)", step S307 is repeated.

For example, in the example in FIG. 5, the capture state notification unit 210b in the measuring device 200b continues monitoring whether or not the measuring device 200b as the "next measuring device" has acquired the IP packet(s) as many as the "number of duplicate packet(s)" (i.e., has acquired one IP packet) after the measuring time period T32 starts. The judgment in step S307 is made by the capture state notification unit 210b. Therefore, after the measuring time period T32 starts, the process in step S307 is repeated until the measuring device 200b captures the first packet P11. When the measuring device 200b captures the packet P11, control is passed to step S308.

Then, in step S308, the "next measuring device" notifies the sharing control processing unit 202a that it has acquired the IP packet(s) as many as the "number of duplicate packet(s)". For example, in the example in FIG. 5, the capture state notification unit 210b in the measuring device 200b as the "next measuring device" issues the notification of step S308 to the sharing control unit 206a in the sharing control processing unit 202a. The transition from step S307 to step S308, and the execution in step S308 correspond to step S204 in FIG. 5.

Then, in step S309, the sharing control processing unit 202a instructs the measuring device currently in measurement to stop measurement. Note that the following two points.

When the process in step S309 is executed, two measuring devices simultaneously execute the packet capture.

However, the "measuring device currently in measurement" described herein with respect to step S309 refers to the "measuring device currently in measurement" described with respect to step S304.

For example, in the example in FIG. 5, the sharing control unit 206a in the sharing control processing unit 202a determines, in step S309, to let the measuring device 200a as the "measuring device currently in measurement" stop the capture. Then, according to the determination, the sharing instruction unit 205a instructs the capture control unit 211a in the measuring device 200a to stop the capture.

Upon receipt of the instruction, the "measuring device currently in measurement" stops measurement (i.e., packet capture) in step S310. For example, in the example in FIG. 5, the capture control unit 211a performs control to stop the capture, and the measuring device 200a stops the capture. Steps S309 and S310 correspond to step S205 in FIG. 5.

Then in step S311, it is judged whether or not the measurement is to be continued. For example, if the measuring device 200a receives an input for giving an instruction to stop the capture through an input device not illustrated in the attached drawings, the sharing control processing unit 202a judges that the measurement is not to be continued, and the process in FIG. 6 terminates. On the other hand, if there is no input for giving an instruction to stop the capture, the sharing control processing unit 202a judges that the measurement is to be continued.

If it is judged in step S311 that the measurement is to be continued, control is returned to step S304. Upon this return, the "next measuring device" at present is regarded as a new "measuring device currently in measurement". For example, in the example in FIG. 5, the measuring device 200b, which is the "next measuring device" at present, is regarded as a new "measuring device currently in measurement", and then the processes in and after step S304 in FIG. 6 are repeated.

The capturing operation according to the first embodiment is described in detail above with reference to FIGS. 5 and 6.

Then, an example of the aggregating operation according to the first embodiment is described below with reference to FIGS. 7 and 8. A specific aggregating operation may vary depending on the duplicate packet condition, and explained below is the case in which the sharing settings of (1e) above are used. In addition, when the packet P11 in FIG. 5 is a user packet, FIG. 5 is applicable to the sharing settings of (1e). Therefore, the following description is made with reference to FIG. 5 accordingly.

Figure 7:
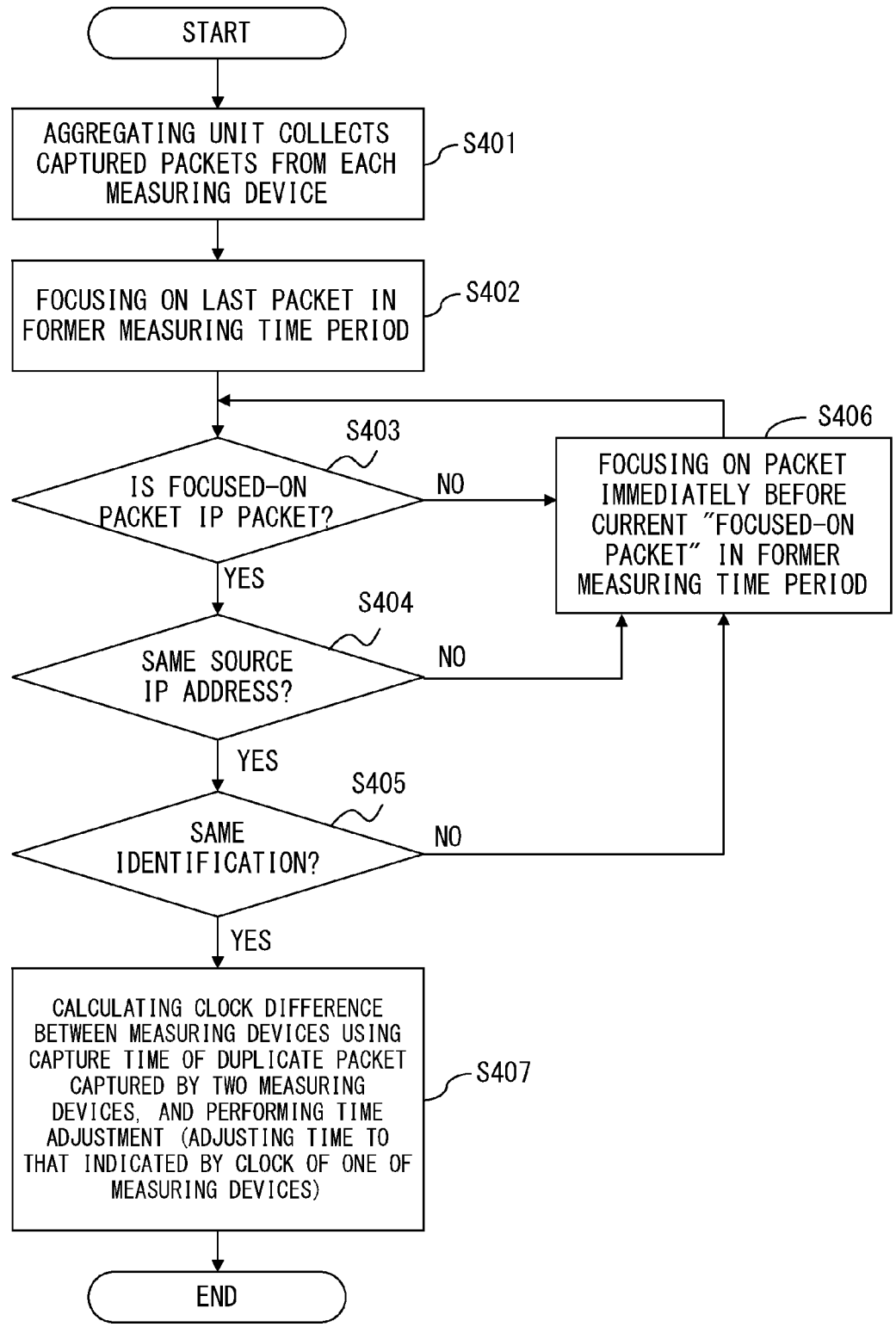
FIG. 7 is a flowchart of an aggregating operation according to the first embodiment.

FIG. 7 is a flowchart of the aggregating operation according to the first embodiment. The steps preceding step S407 in FIG. 7 correspond to the first procedure of the aggregating operation described above with reference to FIG. 2, and step S407 in FIG. 7 corresponds to the second procedure of the aggregating operation.

In step S401, the aggregating unit 208a in the aggregation processing unit 203a collects the packets captured by the measuring devices 200a, 200b, and 200c from the measuring devices 200a, 200b, and 200c, respectively.

The collection of packets captured by the measuring device 200a may be realized by, for example, the internal data transfer within the measuring device 200a from the first storage area for storing captured packets to the second storage area for storing collected packets. The first storage area is managed by the capture control processing unit 204a, and the second storage area is managed by the aggregating unit 208a. The second storage area may be, for example, a hard disk device not illustrated in the attached drawings.

The packets captured by the measuring device 200b are collected through the communication unit 214b, the monitor target path 230, and the communication unit 214a. Similarly, the packets captured by the measuring device 200c are collected through the communication unit 214c, the monitor target path 230, and the communication unit 214a.

The timing of executing the process in step S401 is arbitrarily determined. For example, when the communication quality measurement system 110-1 is used to analyze captured packets in nearly real time, each of the measuring devices 200a, 200b, and 200c may output a captured packet each time one packet is captured, and the aggregating unit 208a may continuously collect the outputted packets.

Otherwise, when a real-time analysis is not required, each of the measuring devices 200a, 200b, and 200c may collectively output the captured packets for each measuring time period. Otherwise, each of the measuring devices 200a, 200b, and 200c may accumulate packets, which the measuring device itself has captured, in a hard disk device etc. not illustrated in the attached drawings while the repetitive pattern of the sharing order is repeated plural times. Then, for example, at a predetermined time appropriate for a maintaining operation such as a time period in which the amount of communication between the routers 120 and 130 is small, the aggregating unit 208a may collect the packets.

FIG. 7 illustrates only the aggregating operation on the packets captured in two adjacent measuring time periods for simplicity of explanation. However, it is obvious that repeating the process in FIG. 7 enables the aggregating operation on packets captured by a plurality of measuring devices over three or more measuring time periods.

For convenience of explanation, let the first user packet captured in the latter measuring time period of two adjacent measuring time periods be hereinafter referred to as a "reference packet". After collecting packets in step S401, the aggregating unit 208a identifies a packet that is captured in the former measuring time period in the two adjacent measuring time periods and that is the same as the reference packet. In FIG. 7, the processes in steps S402 through S406 correspond to the process of identifying the same packet as the reference packet.

For example, in the example in FIG. 5, the "two adjacent measuring time periods" are the measuring time periods T31 and T32. In addition, in step S401, the aggregating unit 208a collects the packets P1 through P11 captured in the measuring time period T31 and the packets P11, P12, and so on captured in the measuring time period T32.

In this case, the "former measuring time period" is the measuring time period T31, the "latter measuring time period" is the measuring time period T32, and the "reference packet" is the packet P11 collected from the measuring device 200b. Therefore, after executing the process in step S401, the aggregating unit 208a executes the processes in steps S402 through S406 in order to identify the same packet as the reference packet from among the packets collected from the measuring device 200a.

Specifically, in step S402, the aggregating unit 208a focuses on the last packet in the "former measuring time period". Hereafter, the packet focused on is referred to as a "focused-on packet" for convenience. For example, in the example in FIG. 5, the aggregating unit 208a focuses on the packet P11 which is the last packet captured by the measuring device 200a in the measuring time period T31.

The processes in subsequent steps S403 through S406 are those to search for the same packet as the reference packet by checking the packets captured in the "former measuring time period" sequentially from the last.

That is, in step S403, the aggregating unit 208a checks whether or not the focused-on packet is an IP packet. If the focused-on packet is an IP packet, control is passed to step S404. If the focused-on packet is not an IP packet, control is passed to step S406.

In step S404, the aggregating unit 208a checks whether or not the source IP address of the reference packet and that of the focused-on packet are the same. If the source IP addresses of both of the packets are the same, control is passed to step S405. If not, control is passed to step S406.

Then, in step S405, the aggregating unit 208a checks whether or not the identification of the reference packet and that of the focused-on packet are the same. If both of the packets have the same identification, control is passed to step S407. If not, control is passed to step S406.

The reason why the identity between the reference packet and the focused-on packet is determinable by the processes in steps S403 through S405 is described below with reference to FIG. 8.

Figure 8:
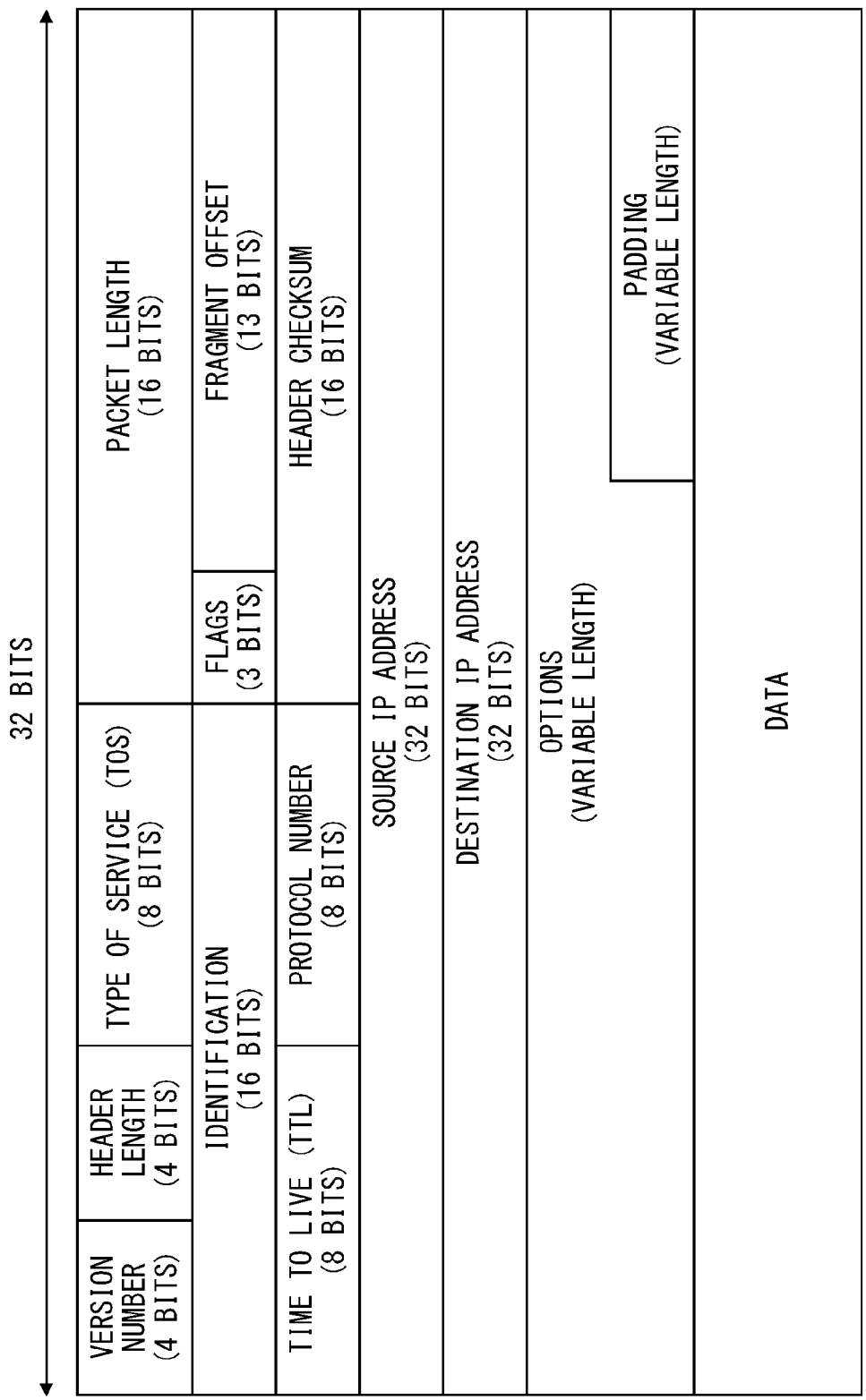
FIG. 8 is an explanatory view of the format of an IP packet of IPv4 (IP version 4)

FIG. 8 is an explanatory view of the format of an IP packet of IPv4 (IP version 4).

As illustrated in FIG. 8, the IP packet of IPv4 includes a header and a data payload. The header includes the following fields. The number of bits in the parentheses in the following list indicates the length of the corresponding field.

version number (4 bits)
header length (4 bits)
ToS (type of service) (8 bits)
packet length (16 bits)
ID (identification) (16 bits)
flags (3 bits)
fragment offset (13 bits)
TTL (time to live) (8 bits)
protocol number (8 bits)
header checksum (16 bits)
source IP address (32 bits)
destination IP address (32 bits)
options (variable length)
padding (variable length)

Since the meaning of each field is well known, the detailed description is omitted here.

The portion relating to the present embodiment is described below. For example, when the configuration of the network 100 guarantees that no fragmentation occurs, an IP packet is uniquely identifiable by a combination of its source IP address and its ID because the ID field indicates the identification information assigned by the source host in order to identify the IP packet. In FIG. 7, for simplicity of explanation, it is assumed that there occurs no fragmentation.

Note that, even when the fragmentation may possibly occur in the network 100, the aggregating unit 208a is also able to determine the identity between IP fragment packets according to a combination of the source IP address, the ID, and the fragment offset. Accordingly, the step of comparing the fragment offsets of the reference packet and the focused-on packet may be added to the process in FIG. 7.

Back in FIG. 7, when the execution of the processes insteps S403 through S405 proves that the reference packet and the focused-on packet are identical, control is passed to step S407. For example, in the example in FIG. 5, since the focused-on packet that is focused on in step S402 is the packet P11 that is captured by the measuring device 200a, the focused-on packet is identical to the reference packet (i.e., the packet P11 that is captured by the measuring device 200b). Therefore, control is passed from step S405 to step S407.

On the other hand, when it is proven that the reference packet and the focused-on packet are not identical, control is passed to step S406. In step S406, the aggregating unit 208a focuses on the packet immediately before the current "focused-on packet" among the packets captured in the "former measuring time period", and regards it as a new "focused-on packet". Then, control is returned to step S403. So far as the full capture is realized, control does not fail to be passed to step S407 after the processes in steps S403 through S405 are executed one or more times.

In step S407, the relative time adjustment unit 209a calculates the clock difference between two measuring devices using the capture time of the duplicate packet(s) captured by the two measuring devices in the two adjacent measuring time periods, thereby adjusting the time. For example, the relative time adjustment unit 209a adjusts the capture time of each collected packet to the time indicated by the clock of one of a plurality of measuring devices.

In addition, the aggregating unit 208a is able to reconstruct a series of packets without duplication by deleting the duplicate packet(s) identified through the processes in steps S402 through S406.

The details of the time adjustment in step S407 are as described with reference to FIG. 2. For example, according to the first embodiment, the relative time adjustment unit 209a may perform the adjustment for representing the capture time of each collected packet by the clock of the measuring device 200a.

After the execution of the process in step S407, the process in FIG. 7 terminates. The result of the process in FIG. 7 is available for various analyses such as a jitter analysis etc.

In addition, the processes in steps S403 through S405 may be appropriately modified depending on the duplicate packet condition. For example, in the case of the example of (1f) described with reference to FIG. 5, the aggregating unit 208a may further check whether or not the following three conditions are satisfied. When the following three conditions and the conditions in steps S403 through S405 are satisfied, the aggregating unit 208a may judge that the reference packet and the focused-on packet are identical.

The reference packet and the focused-on packet are RTP packets.
The source port number in the UDP header of the reference packet and that of the focused-on packet are identical.
The sequence number in the RTP header of the reference packet and that of the focused-on packet are identical.

The first embodiment is described above with reference to FIGS. 4 through 8.

The second embodiment is described below with reference to FIGS. 9 through 11. Explanation for the common points with the first embodiment is omitted accordingly.

Figure 9:
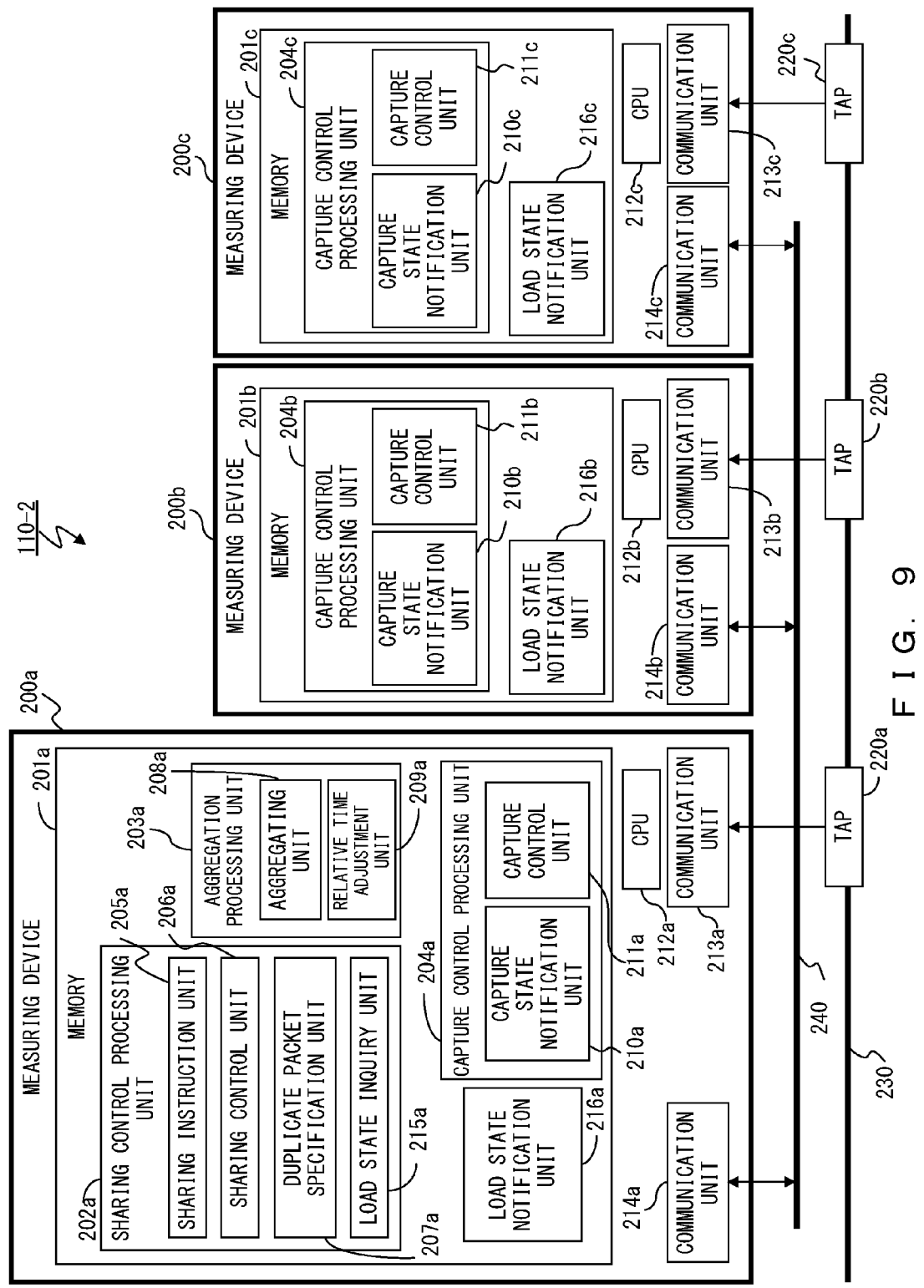
FIG. 9 is a configuration diagram of a communication quality measurement system according to the second embodiment.

FIG. 9 is a configuration diagram of a communication quality measurement system according to the second embodiment. A communication quality measurement system 110-2 in FIG. 9 is different in the following three points from the communication quality measurement system 110-1 in FIG. 4 according to the first embodiment.

First, The sharing control processing unit 202a further includes a load state inquiry unit 215a that issues, to each of the measuring devices 200a, 200b, and 200c, an inquiry about the load state.

Secondly, The measuring devices 200a, 200b, and 200c respectively includes load state notification units 216a, 216b, and 216c. In response to the inquiry from the load state inquiry unit 215a, each of the load state notification units 216a, 216b, and 216c notifies the load state inquiry unit 215a of the load state. The inquiry and the response between the load state inquiry unit 215a and the load state notification unit 216a may be realized by, for example, the inter-process communication within the measuring device 200a similarly to the communications between the sharing control unit 206a and the capture state notification unit 210a. The communication between the load state inquiry unit 215a and the load state notification unit 216b is performed through the communication units 214a and 214b. The communication between the load state inquiry unit 215a and the load state notification unit 216c is performed through the communication units 214a and 214c.

Thirdly, the communication units 214a, 214b, and 214c are connected to a communication path 240 which is independent of the monitor target path 230. The communications among the measuring devices 200a, 200b, and 200c are performed through the communication path 240.

Note that the load state about which the load state inquiry unit 215a issues an inquiry is, for example, a CPU usage percentage, a memory usage percentage, a remaining capacity of a storage area for storing captured packets, and a combination of them.

In addition, for example, the measuring devices 200a, 200b, and 200c may be connected to the same switching hub (not illustrated in the attached drawings) respectively through the communication units 214a, 214b, and 214c. In this case, the communication path 240 is a routing path within the switching hub. Otherwise, the communication path 240 may be a radio communication path, and each of the communication units 214a, 214b, and 214c may be wireless communication interfaces.

The sharing control rule according to the second embodiment is defined by a combination of the following.
  An inquiry item(s) about which the load state inquiry unit 215a issues an inquiry to the load state notification units 216a, 216b, and 216c
  A selection criterion for selecting one measuring device based on a result of the inquiry Therefore, according to the second embodiment, unlike the first embodiment, the actual order in which the measuring devices 200a, 200b, and 200c share the capture is dynamically determined depending of the result of the inquiry. The load state inquiry unit 215a is an example of an inquiry unit that issues an inquiry about an inquiry item(s).

Listed below are (2a) and (2b) as examples of the sharing settings according to the second embodiment.
  (2a) example of the sharing settings based on the CPU usage percentage
  (2b) example of the sharing settings based on the memory usage percentage Specifically, in the example of (2a) above, based on the CPU usage percentage, the condition such as "the CPU usage percentage has exceeded 80%" is set as the stop criterion.

In addition, in the example of (2a), the sharing control rule includes a setting that defines, for example, the measuring device 200a as a measuring device which is to first perform the capture when the communication quality measurement system 110-2 starts the capture.

Furthermore, the sharing control rule in the example of (2a) includes an inquiry item(s) about which the load state inquiry unit 215a issues an inquiry when the measuring device which is performing the capture satisfies the stop criterion. This inquiry is issued to other measuring devices which are not performing the capture. Hereafter, a measuring device which is not performing the capture is referred to as an "inactive measuring device" for convenience. More specifically, the CPU usage percentage is set as the inquiry item so that the stop criterion and the inquiry item have the contents relating to the same resource. Otherwise, a combination of the clock rate of the CPU and the CPU usage percentage etc. may be used as the inquiry items.

In addition, the sharing control rule in the example of (2a) includes a selection criterion for selecting one response from among the responses responding to the inquiry issued to the inactive measuring devices. The selection criterion is preferably a criterion for selecting a response indicating the lowest load from among the responses to the inquiry.

For example, when the measuring device 200a is performing the capture in FIG. 9, the inactive measuring devices are the measuring devices 200b and 200c. Therefore, the load state inquiry unit 215a inquires of the load state notification unit 216b in the measuring device 200b about the usage percentage of the CPU 212b, and inquires of the load state notification unit 216c in the measuring device 200c about the usage percentage of the CPU 212c.

For example, assume that the response of "5%" is acquired from the load state notification unit 216b and the response of "15%" is acquired from the load state notification unit 216c. In this case, the response that indicates the lowest load (i.e., the lowest CPU usage percentage) is the response of "5%". Therefore, in this case, the sharing control unit 206a selects the response of "5%" based on the selection criterion, and determines the measuring device 200b, which has returned the response of "5%", as the next measuring device.

Taking the case in which the CPU usage percentage temporarily increases (i.e., increases in a moment but immediately decreases) into consideration, the stop criterion may be a condition such as "the state in which the CPU usage percentage exceeds 80% continues for 5 or more seconds".

The duplicate packet condition in the example of (2a) may be, for example, similar to that in the example of (1a).

Next, the example of the sharing settings of (2b), which is based on the memory usage percentage, is described below.

In the example of (2b), based on the memory usage percentage, the condition such as "the memory usage percentage has exceeded 80%" is set as the stop criterion.

In addition, the sharing control rule in the example of (2b) includes, like the example of (2a), a setting that defines, for example, the measuring device 200a as a measuring device which is to first perform the capture when the communication quality measurement system 110-2 starts the capture. Furthermore, the inquiry item(s) included in the sharing control rule is/are, for example, at least one of a memory usage amount, a memory usage percentage, a remaining amount of memory, etc. The selection criterion is, for example, a criterion for selecting the response indicating the lowest load from among the responses to the inquiry. For example, when the capacities of the memories 201a, 201b, and 201c are equal, the memory usage amount may be set as an inquiry item, and the criterion for selecting the response indicating the lowest memory usage amount may be set as the selection criterion.

Taking the case in which the memory usage percentage temporarily increases (i.e., increases in a moment but immediately decreases) into consideration, the stop criterion may be the condition such as "the state in which the memory usage percentage exceeds 80% continues 5 seconds or more".

Also in the example of (2b) above, the duplicate packet condition may be, for example, similar to that in the example of (1a).

As described above, the examples of (2a) and (2b) are listed as examples of the sharing settings according to the second embodiment; but the total load state, which is defined based on the usage state of the CPU resource and that of the memory resource, is also available for the stop criterion and the inquiry item(s).

Described below is the case in which the sharing settings of (2a) are set in the sharing control processing unit 202a, for convenience of explanation.

Figure 10:
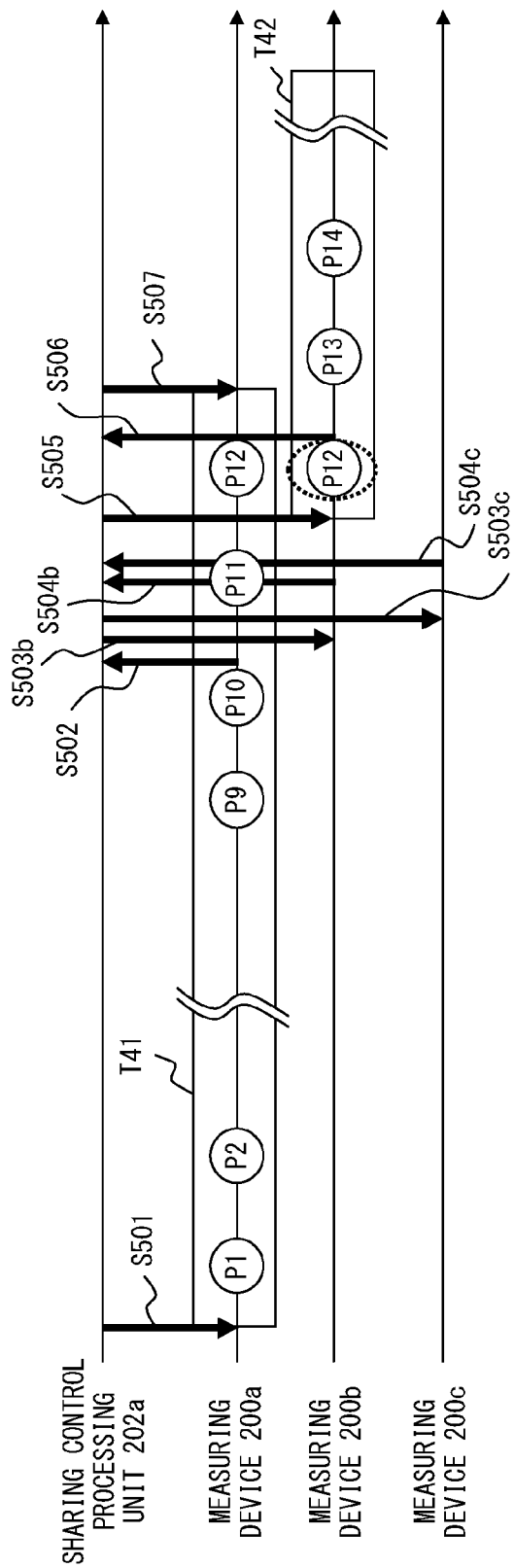
FIG. 10 is an explanatory view of a capturing operation according to the second embodiment.

FIG. 10 is an explanatory view of a capturing operation according to the second embodiment.

In step S501, the sharing control unit 206a in the sharing control processing unit 202a determines, based on the sharing order being set, that the measuring device which is to first capture packets is the measuring device 200a. Then, the sharing instruction unit 205a instructs the capture control unit 211a to start the capturing operation based on the determination.

Then, the capture control unit 211a performs control to start the capturing operation according to the instruction. The measuring time period T41 in FIG. 10 starts from the time point when the measuring device 200a starts the capturing operation.

In the measuring time period T41, the capture state notification unit 210a keeps monitoring the state of the capturing operation, and specifically monitors whether or not the stop criterion is satisfied. Assumptions in FIG. 10 are as follows.

Until the measuring device 200a acquires packets P1 through P10, the usage percentage of the CPU 212a in the measuring device 200a remains equal to or smaller than 80% and thereby the stop criterion remains unsatisfied.

However, immediately after the measuring device 200a captures the packet P10, the usage percentage of the CPU 212a exceeds 80% and thereby the stop criterion is satisfied.

Then, in step S502, the capture state notification unit 210a notifies the sharing control unit 206a that the stop criterion has been satisfied. The inactive measuring devices at the time when this notification is received are the measuring devices 200b and 200c.

Then, in step S503b, the load state inquiry unit 215a inquires of the load state notification unit 216b in the measuring device 200b about the CPU usage percentage, which is set as the inquiry item. The inquiry is issued through the communication unit 214a, the communication path 240, and the communication unit 214b.

Similarly, in step S503c, the load state inquiry unit 215a inquires of the load state notification unit 216c in the measuring device 200c about the CPU usage percentage, which is set as the inquiry item. The inquiry is issued through the communication unit 214a, the communication path 240, and the communication unit 214c.

The execution order of steps S503b and S503c is arbitrarily determined. The load state inquiry unit 215a may simultaneously execute the processes of steps S503b and S503c by broadcasting the inquiry item to the communication path 240 through the communication unit 214a.

Then, in step S504b, the load state notification unit 216b in the measuring device 200b notifies the measuring device 200a of the usage percentage of the CPU 212b as the load state of the measuring device 200b through the communication unit 214b, the communication path 240, and the communication unit 214a. In the description below, for convenience of explanation, it is assumed that the CPU usage percentage of "5%" is notified in step S504b.

Similarly, in step S504c, the load state notification unit 216c in the measuring device 200c notifies the measuring device 200a of the usage percentage of the CPU 212c as the load state of the measuring device 200c through the communication unit 214c, the communication path 240, and the communication unit 214a. In the description below, for convenience of explanation, it is assumed that the CPU usage percentage of "15%" is notified in step S504c. Note that the execution order of steps S504b and S504c is arbitrary.

In addition, a new packet P11 may flow on the monitor target path 230 during the execution of the processes in steps S503b, S503c, S504b, and S504c. As illustrated in FIG. 10, the packet P11 is also captured by the measuring device 200a, which has not yet stopped the capture.

Afterwards, in step S505, the sharing control unit 206a in the measuring device 200a, which has received the notification from each inactive measuring device (i.e., from each of the measuring devices 200b and 200c), recognizes that the measuring device 200b indicates the lowest CPU usage percentage. Then, the sharing control unit 206a determines the measuring device 200b as the next measuring device. According to the determination by the sharing control unit 206a, the sharing instruction unit 205a instructs the capture control unit 211b in the measuring device 200b to start the capture. This instruction is issued through the communication unit 214a, the communication path 240, and the communication unit 214b.

Next, the capture control unit 211b performs control to start the capturing operation. The measuring time period T42 in FIG. 10 starts from the time point when the measuring device 200b starts the capturing operation. In the measuring time period T42, the capture state notification unit 210b keeps monitoring the state of the capturing operation, and specifically monitors whether or not the duplicate packet condition and the stop criterion are satisfied.

Then, when a packet P12 flows on the monitor target path 230, the packet P12 is captured by both of the measuring devices 200a and 200b. Then, the duplicate packet condition is satisfied because the measuring device 200b has actually captured one packet after starting the capture. The capture state notification unit 210b is able to recognize the satisfaction of the duplicate packet condition by counting the number of packet(s) captured by the measuring device 200b from the starting point of the measuring time period T42.

Then, in step S506, the capture state notification unit 210b notifies the sharing control unit 206a that the duplicate packet condition has been satisfied. This notification is issued through the communication unit 214b, the communication path 240, and the communication unit 214a.

Upon receipt of the notification, the sharing control unit 206a determines in step S507 that the capture by the measuring device 200a is to be stopped. According to the determination by the sharing control unit 206a, the sharing instruction unit 205a then instructs the capture control unit 211a in the measuring device 200a to stop the capture.

Then, the capture control unit 211a performs control to stop the capture, and the measuring device 200a stops the capture, thereby terminating the measuring time period T41. As described above, the measuring device 200a continues the capture even after the stop criterion is satisfied in step S502. Therefore, the measuring device 200a captures the packet P12. That is, the packet P12 is double captured by both of the measuring devices 200a and 200b.

After step S507, the measuring device 200b continues capturing packets P13, P14, etc.

As with the first embodiment, the stop criterion and the duplicate packet condition may be notified from the sharing control processing unit 202a before step S501, or may be notified with an instruction to start the capture.

The capturing operation described above with reference to FIG. 10 is further described below with reference to FIG. 11. Explanation for the common points with FIG. 6 is accordingly omitted below.

FIG. 11 is a flowchart of a capturing operation according to the second embodiment.

In step S601, the sharing control processing unit 202a acquires the sharing settings. In the description below, it is assumed for convenience of explanation that the sharing settings of (2a) are used. Specifically, the stop criterion and the sharing control rule are acquired by the sharing control unit 206a, and the number of duplicate packet(s) as the duplicate packet condition is acquired by the duplicate packet specification unit 207a.

Next, in step S602, the sharing control processing unit 202a instructs the first measuring device to start measurement, according to the sharing control rule. That is, according to the sharing control rule, the sharing control unit 206a in the sharing control processing unit 202a determines the measuring device for first performing the capturing operation. Then, according to the determination, the sharing instruction unit 205a instructs the first measuring device to start the capturing operation. In the example in FIG. 10, the first measuring device is the measuring device 200a.

Then, upon receipt of the instruction, the first measuring device starts measurement (i.e., packet capture) in step S603. Steps S602 and S603 correspond to step S501 in FIG. 10.

In the next step S604, it is judged whether or not the CPU usage percentage exceeds 80% in the measuring device currently in measurement. The meaning of the "measuring device currently in measurement" in FIG. 11 is the same as that in FIG. 6.

Unless the CPU usage percentage exceeds 80%, the monitoring in step S604 is repeated. When the CPU usage percentage exceeds 80%, the capture state notification unit in the "measuring device currently in measurement" (for example, the capture state notification unit 210a in the measuring device 200a) notifies the sharing control unit 206a in the sharing control processing unit 202a that the capture is planned to be stopped, and control is passed to step S605. The transition from step S604 to step S605 corresponds to step S502 in FIG. 10.

Then in step S605, the load state inquiry unit 215a in the sharing control processing unit 202a inquires of the measuring devices other than the "measuring device currently in measurement" (i.e., inquires of the inactive measuring devices) about the CPU usage percentage, which is the inquiry item being set. Then, the CPU usage percentage is notified from each inactive measuring device.

Step S605 described above corresponds to steps S503b and S504c in FIG. 10.

Then, in step S606, the sharing control unit 206a determines a measuring device with the lowest CPU usage percentage (for example, the measuring device 200b in the example in FIG. 10) as the next measuring device based on the selection criterion. The meaning of the "next measuring device" in FIG. 11 is the same as that in FIG. 6. Furthermore, based on the determination by the sharing control unit 206a, the sharing instruction unit 205a instructs the measuring device 200b to start the capture.

Then, in step S607, the "next measuring device" starts measurement. Steps S606 and S607 correspond to step S505 in FIG. 10.

In the next step S608, it is judged whether or not the "next measuring device" has acquired the IP packet(s) as many as the "number of duplicate packet(s)". The process in step S608 is repeated until the "next measuring device" acquires the IP packet(s) as many as the "number of duplicate packet(s)".

If the "next measuring device" acquires the IP packet(s) as many as the "number of duplicate packet(s)", then in step S609, the capture state notification unit (for example, the capture state notification unit 210b) in the "next measuring device" notifies the sharing control processing unit 202a that the IP packet(s) as many as the "number of duplicate packet(s)" has/have been acquired. The transition from step S608 to step S609, and execution in step S609 correspond to step S506 in FIG. 10.

Next, in step S610, the sharing control processing unit 202a instructs the "measuring device currently in measurement" to stop the measurement.

Then, in step S611, the "measuring device currently in measurement" stops the measurement (i.e., the packet capture). Steps S610 and S611 correspond to step S507 in FIG. 10.

Then in step S612, it is judged, in a method similar to that of the first embodiment or in another way, whether or not the measurement is to be continued. If it is judged in step S612 that the measurement is to be continued, control is returned to step S604. Upon this return, the current "next measuring device" is regarded as a new "measuring device currently in measurement". On the other hand, if it is judged in step S612 that the measurement is not to be continued, then the entire process in FIG. 11 terminates.

The capturing operation according to the second embodiment is described above in detail with reference to FIGS. 9 through 11.

The aggregating operation according to the second embodiment is similar to that according to the first embodiment except that captured packets are collected through the communication path 240, not through the monitor target path 230. Therefore, the detailed description is omitted here.

Next, the third embodiment is described below with reference to FIGS. 12 through 15. Explanation for the common points with the first or second embodiment is accordingly omitted below.

Figure 12:
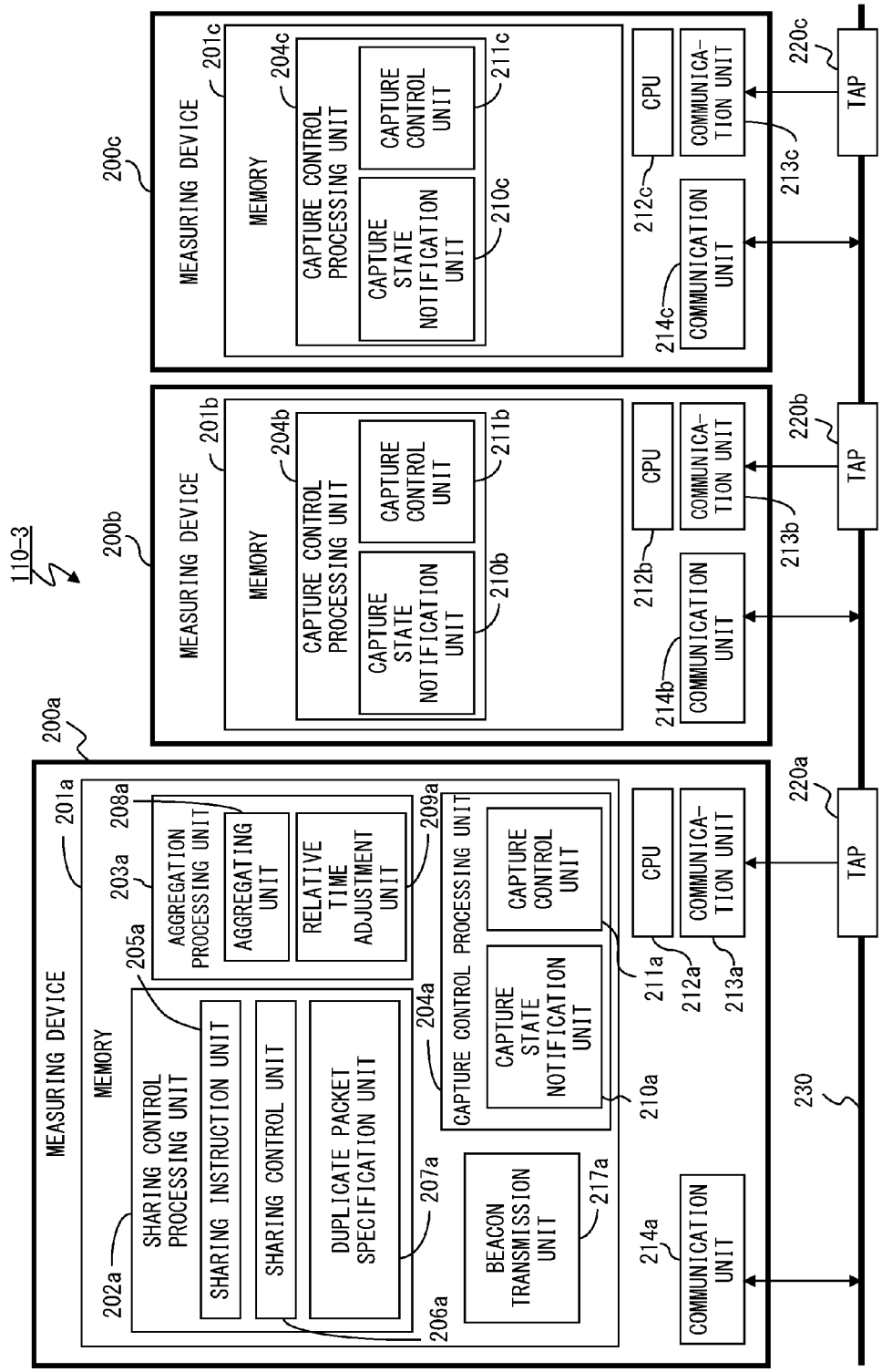
FIG. 12 is a configuration diagram of a communication quality measurement system according to the third embodiment.

FIG. 12 is a configuration diagram of a communication quality measurement system according to the third embodiment. A communication quality measurement system 110-3 in FIG. 12 is different from the communication quality measurement system 110-1 according to the first embodiment in FIG. 4 in that the measuring device 200a further includes a beacon transmission unit 217a.

The beacon transmission unit 217a transmits beacon packets to the monitor target path 230 through the communication unit 214a at regular intervals. A specific format of a beacon packet may be arbitrarily determined. In the present embodiment, the "beacon packet" is defined as a packet with the following properties.

- including a unique identification number (hereinafter, the identification number is referred to as a "beacon number")
- being transmitted at regular intervals
- being in a predetermined format In the present embodiment, the measuring devices 200a, 200b, and 200c capture beacon packets flowing on the monitor target path 230, respectively through the taps 220a, 220b, and 220c and the communication units 213a, 213b, and 213c. As described above with reference to the first embodiment, the capture control processing units 204a, 204b, and 204c may perform control to discard a management packet. In this case, according to the third embodiment, the capture control processing units 204a, 204b, and 204c perform control so as not to discard a beacon packet, which is a type of management packet (in other words, perform control so as to regard a beacon packet as an exception).

The beacon packets may be broadcast through the monitor target path 230. In this case, it is preferable that the routers 120 and 130, which are illustrated in FIG. 3 and positioned at both ends of the monitor target path 230, are configured in advance so as to discard any packets whose source is the measuring device 200a, 200b, or 200c. This configuration prevents the beacon packets from flowing into the network 140 and the WAN 150.

For convenience of explanation in the following description, it is assumed that the sharing order and the stop criterion as in the example of (1a) according to the first embodiment are set in the sharing control unit 206a. However, other sharing order and stop criterion may also be available in another embodiment.

The duplicate packet condition according to the third embodiment is, for example, the condition that the number of beacon packet(s) in the packet(s) actually captured after the start of the capture reaches one. That is, the duplicate packet condition according to the third embodiment is defined by the number of duplicate packet(s) and the attribute of a packet (i.e., the attribute of "being a beacon packet"). The number of duplicate packet(s) may be fixed, or may be variable as in the example of (1h).

Next, the capturing operation by the communication quality measurement system 110-3 is described below with reference to FIG. 13.

Figure 13:
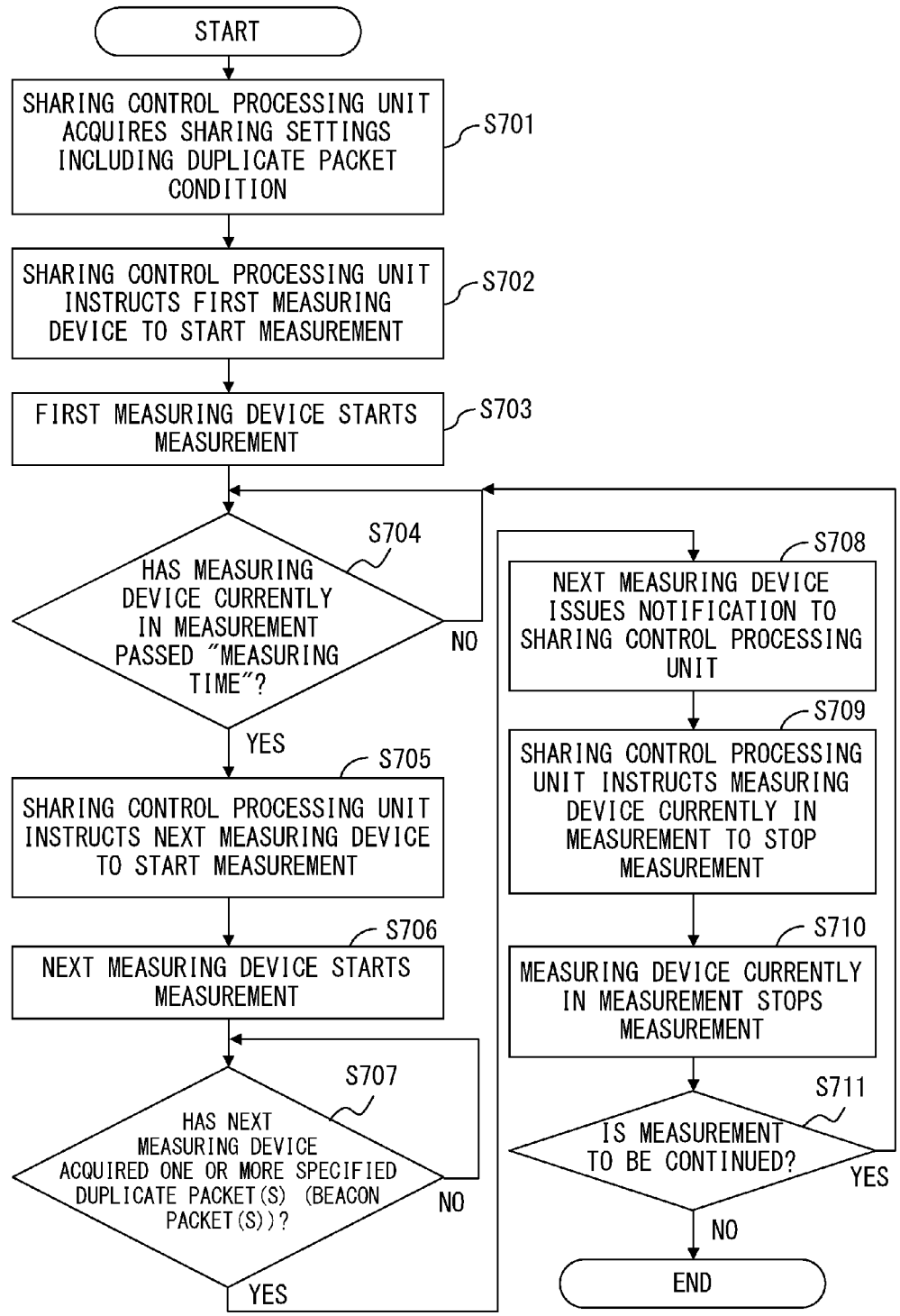
FIG. 13 is a flowchart of a capturing operation according to the third embodiment.

FIG. 13 is a flowchart of a capturing operation according to the third embodiment. The explanation for the common points with FIG. 6 is accordingly omitted below.

In step S701, the sharing control processing unit 202a acquires the sharing settings including the duplicate packet condition. Specifically, the sharing control unit 206a acquires the stop criterion and the sharing control rule, and the duplicate packet specification unit 207a acquires the duplicate packet condition.

Next, in step S702, the sharing control processing unit 202a instructs the first measuring device to start measurement, according to the sharing order. That is, according to the sharing order, the sharing control unit 206a in the sharing control processing unit 202a determines the measuring device for first performing the capturing operation. According to the determination, the sharing instruction unit 205a instructs the first measuring device to start the capturing operation. For example, according to the sharing order of (1a), the first measuring device is the measuring device 200a.

Upon receipt of the instruction, the first measuring device starts measurement (i.e., packet capture) in step S703.

In the next step S704, it is judged whether or not the measuring time set as the stop criterion has passed in the measuring device currently in measurement. The meaning of the "measuring device currently in measurement" is the same as that in FIG. 6.

Unless the measuring time has passed, the monitoring in step S704 is repeated. If the measuring time has passed, the capture state notification unit in the "measuring device currently in measurement" (for example, the capture state notification unit 210a in the measuring device 200a) notifies the sharing control unit 206a in the sharing control processing unit 202a that the capture is planned to be stopped, and control is passed to step S705.

Then in step S705, the sharing control processing unit 202a instructs the next measuring device to start the measurement, according to the sharing order. The meaning of the "next measuring device" is the same as that in FIG. 6.

Then in step S706, the "next measuring device" starts the measurement.

In the next step S707, it is judged whether or not the "next measuring device" has acquired one or more duplicate packet(s) (which is/are specifically as many as the number of duplicate packet(s) defined by the duplicate packet condition) with the attribute specified in the duplicate packet condition (i.e., with the attribute of "being a beacon packet"). For example, when the "next measuring device" is the measuring device 200b, the capture state notification unit 210b monitors the state of the packet capture by the measuring device 200b, and the judgment in step S707 is performed by the capture state notification unit 210b.

The process in step S707 is repeated until the "next measuring device" acquires the beacon packet(s) as many as the "number of duplicate packet(s)". When the "next measuring device" acquires the beacon packet(s) as many as the "number of duplicate packet(s)", control is passed to step S708.

Then, in step S708, the "next measuring device" (specifically for example, the capture state notification unit 210b) notifies the sharing control processing unit 202a that the beacon packet(s) as many as the "number of duplicate packets" has/have been acquired.

Next, in step S709, the sharing control processing unit 202a instructs the "measuring device currently in measurement" to stop the measurement.

Then in step S710, the "measuring device currently in measurement" stops measurement (i.e., packet capture).

Furthermore, in step S711, it is judged whether or not the measurement is to be continued, as in step S311 in FIG. 6, for example. If it is judged in step S711 that the measurement is to be continued, control is returned to step S704. Upon this return, the current "next measuring device" is regarded as a new "measuring device currently in measurement". On the other hand, if it is judged in step S711 that the measurement is not to be continued, the entire process in FIG. 13 terminates.

Next, the aggregating operation according to the third embodiment is described below with reference to FIGS. 14 and 15.

FIG. 14 is an explanatory view of an aggregating operation according to the third embodiment. FIG. 14 illustrates the aggregating operation in a format similar to that illustrated in FIG. 2, using the time axes each expressing the time indicated by each clock as horizontal axes.

In FIG. 14, fifteen packets P1 through P15 which are relayed by the router 120 or 130 in FIG. 3 and then flow on the monitor target path 230 in FIG. 12 are expressed as "original data". The packets P1 through P15 are user packets.

Furthermore, according to the third embodiment, the beacon packets, which are transmitted from the beacon transmission unit 217a in FIG. 12 at regular intervals regardless of when the packets P1 through P15 flow, also flow on the monitor target path 230. FIG. 13 illustrates nine beacon packets B1 through B9.

In addition, according to the sharing order being set, the sharing control processing unit 202a performs control so that the measuring devices 200a, 200b, and 200c take charge of the capture in the described order. Thus, as illustrated in FIG. 14, the measuring device 200a captures the packets P1 through P6 and the beacon packets B1 through B4 in the measuring time period T51. In addition, the measuring device 200b captures the packets P7 through P11 and the beacon packets B4 through B7 in the measuring time period T52. Furthermore, the measuring device 200c captures the packets P12 through P15 and the beacon packets B7 through B9 in the measuring time period T53.

According to the duplicate packet condition of the third embodiment, the full capture is realized even if two measuring devices do not double capture the same user packet in two adjacent measuring time periods.

For example, in the example in FIG. 14, although the measuring devices 200a and 200b double capture the beacon packet B4, there is no user packet double captured by the measuring devices 200a and 200b. Similarly, although the measuring devices 200b and 200c double capture the beacon packet B7, there is no user packet double captured by the measuring devices 200b and 200c.

Obviously, two measuring devices may double capture the same user packet in two adjacent measuring time periods depending on the timing with which the user packet flows on the monitor target path 230.

For example, when a user packet Px not illustrated in FIG. 14 flows on the monitor target path 230 before the beacon packet B4 flows and between when the packet P6 flows and when the packet P7 flows, the user packet Px is double captured by the measuring devices 200*a* and 200*b*. In this case, the aggregating unit 208*a* is able to recognize that the user packet Px, which is captured in the measuring time period T52 before the beacon packet B4 being a duplicate packet is captured, is also a packet which is double captured by the measuring devices 200*a* and 200*b*.

In any case, the aggregation processing unit 203*a* identifies double captured beacon packets and thereby reconstructs user packets and beacon packets without duplication while maintaining the sequential order among them. Then, the aggregation processing unit 203*a* corrects the capture time associated with each packet.

In addition, since a beacon packet is in a predetermined format, the aggregating unit 208*a* is able to discriminate a beacon packet from a user packet. Therefore, the aggregating unit 208*a* may remove beacon packets after the reconstruction, and may output only a series of user packets P1 through P15 for the subsequent analyzing process.

The use of a beacon packet as a duplicate packet enables the "measuring device currently in measurement" to stop the capture within a certain time after the stop criterion is satisfied even when, for example, there are only a small number of user packets and even when the flow of user packets stops. The above-mentioned "certain time" refers to a sum of the following values.

- the communication time twice as long as the round-trip time between two of the measuring devices 200*a*, 200*b*, and 200*c*
- the transmission interval of beacon packets In the third embodiment, not only the aggregating unit 208*a* reconstructs the user packets P1 through P15 without duplication while maintaining the order among them, but also the relative time adjustment unit 209*a* adjusts the time. For convenience of explanation, for example, assume as follows.

- The clock of the measuring device 200*b* is 1 second ahead of the clock of the measuring device 200*a*.
- The clock of the measuring device 200*c* is 0.8 second behind the clock of the measuring device 200*a*.
- The reference clock is the clock of the measuring device 200*a*.

Under these assumptions, the relative time adjustment unit 209*a* recognizes that the clock of the measuring device 200*b* is 1 second ahead of the clock of the measuring device 200*a* from the difference in capture time associated by the measuring devices 200*a* and 200*b* with the beacon packet B4 identified as a duplicate packet. Therefore, the relative time adjustment unit 209*a* adjusts the time by subtracting 1 second from each capture time associated by the measuring device 200*b* with each of the packets P7 through P11 and the beacon packets B4 through B7.

Similarly, the relative time adjustment unit 209*a* is able to recognize that the clock of the measuring device 200*c* is 1.8 seconds behind the clock of the measuring device 200*b* from the difference in capture time associated by the measuring devices 200*b* and 200*c* with the beacon packet B7 identified as a duplicate packet. Therefore, the relative time adjustment unit 209*a* is able to recognize that the clock of the measuring device 200*c* is 0.8 second behind the clock of the measuring device 200*a* based on the recognition that the clock of the measuring device 200*b* is 1 second ahead of the clock of the measuring device 200*a*.

As a result, the relative time adjustment unit 209*a* adjusts the time by adding 0.8 second to each capture time associated by the measuring device 200*c* with each of the packets P12 through P15 and the beacon packets B7 through B9.

Next, the aggregating operation is further described with reference to FIG. 15.

Figure 15:
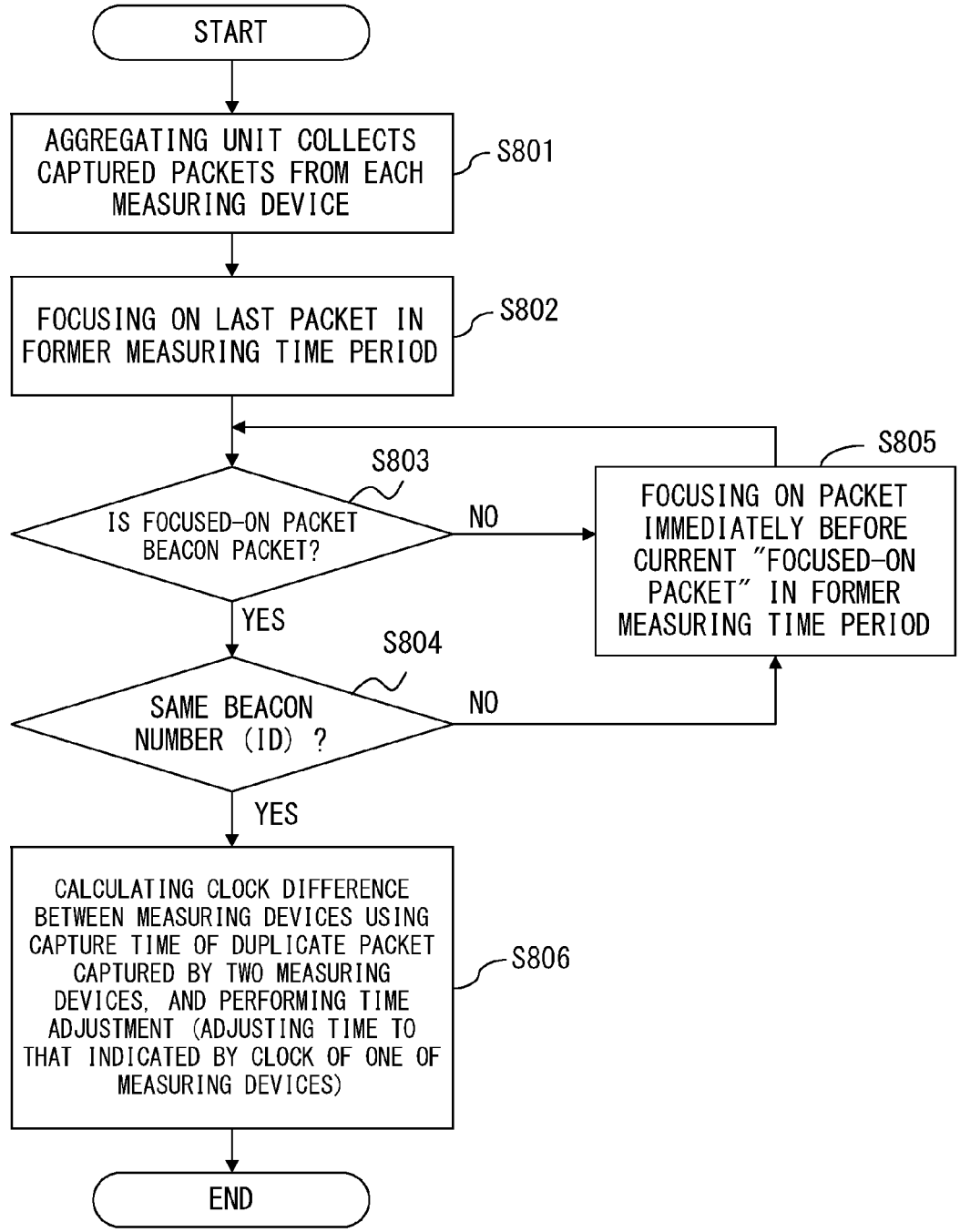
FIG. 15 is a flowchart of an aggregating operation according to the third embodiment.

FIG. 15 is a flowchart of the aggregating operation according to the third embodiment. The explanation for the common points with FIG. 7 is accordingly omitted.

In step S801, the aggregating unit 208*a* in the aggregation processing unit 203*a* collects packets captured by each of the measuring devices 200*a*, 200*b*, and 200*c* from each of the measuring devices 200*a*, 200*b*, and 200*c*.

After collecting the packets in step S801, the aggregating unit 208*a* regards the first beacon packet captured in the latter measuring time period in two adjacent measuring time periods as a reference packet, and identifies a packet that is the same as the reference packet and that is captured in the former measuring time period in the two adjacent measuring time periods. The process for identifying the packet corresponds to the processes in steps S802 through S805. Steps S802 and S805 are similar to steps S402 and S406 in FIG. 7, respectively. In place of steps S403 through S405 in FIG. 7, steps S803 and S804 are executed in the third embodiment.

In step S802, the aggregating unit 208*a* focuses on the last packet in the "former measuring time period".

The processes in the subsequent steps S803 through S805 are those to search for the same packet as the reference packet by checking the packets captured in the "former measuring time period" sequentially from the last.

That is, in step S803, the aggregating unit 208*a* checks whether or not a focused-on packet is a beacon packet. If the focused-on packet is a beacon packet, control is passed to step S804. If the focused-on packet is not a beacon packet, control is passed to step S805.

In step S804, the aggregating unit 208*a* checks whether or not the beacon number of the reference packet and that of the focused-on packet are the same. If the beacon numbers of these two packets are the same, control is passed to step S806. If they are not the same, control is passed to step S805.

That is, when the execution of the processes in steps S803 and S804 proves that the reference packet and the focused-on packet are identical, control is passed to step S806. On the other hand, when it is proven that the reference packet and the focused-on packet are not identical, control is passed to step S805.

In step S805, the aggregating unit 208*a* focuses on the packet immediately before the current "focused-on packet" among the packets captured in the "former measuring time period", and regards it as a new "focused-on packet". Then, control is returned to step S803. So far as the full capture is realized, control does not fail to be passed to step S806 after the processes in steps S803 and S804 are executed one or more times.

In step S806, the relative time adjustment unit 209*a* calculates the clock difference between two measuring devices using the capture time of the duplicate packet(s) captured by the two measuring devices in the two adjacent measuring time periods, thereby adjusting the time. For example, the relative time adjustment unit 209*a* adjusts the capture time of each collected packet to the time indicated by the clock of one of a plurality of measuring devices.

In addition, the aggregating unit 208a is able to reconstruct a series of packets without duplication by deleting the duplicate packet(s) identified through the processes in steps S803 through S805.

The details of the time adjustment in step S806 are as described with reference to FIG. 2. After the execution of the process in step S806, the process in FIG. 15 terminates. The result of the process in FIG. 15 is also available for various analyses such as a jitter analysis etc.

The first through third embodiments are described above. In any embodiment, the capture is shared among a plurality of measuring devices. Therefore, the communication quality measurement system as a whole is enabled to incessantly continue the capture while keeping the amount of capture (i.e., the load caused by executing the capture) per one measuring device small. Therefore, the full capture is realizable even using inexpensive general-purpose devices.

According to the above-mentioned embodiments, the use of a duplicate packet(s) enables correction for expressing the capture time of each packet in the reference clock even when the time synchronization is not performed among a plurality of measuring devices. Therefore, no cost for time synchronization is required.

The present invention is not limited to the embodiments above, but may be modified in various ways. Described below are some examples of modification.

The first or third embodiment may be modified so as to use the communication path 240 independent of the monitor target path 230 as in the second embodiment. On the other hand, the second embodiment may be modified so as to use the monitor target path 230 not the communication path 240 as in the first embodiment.

Furthermore, the second and third embodiments may be combined. Otherwise, in the second embodiment, a condition such as either of (1e) through (1g) may be used as the duplicate packet condition.

In the explanation above, the aggregating operation for reconstructing all captured packets is described. However, in the aggregating operation, the aggregating unit 208a may reconstruct only the packets satisfying a particular condition. For example, the aggregating unit 208a may reconstruct only the packets relating to a particular RTP session.

The time adjustment by the relative time adjustment unit 209a is specifically preferable in analyzing the communication quality in the stream data transmission in which RTP packets are periodically transmitted at predetermined intervals such as 20 msec. etc. For example, only RTP packets may be reconstructed by the aggregating unit 208a, and an analysis system not illustrated in the attached drawings may analyze the intervals between two adjacent packets for each RTP session. The use of the adjusted capture time enables, for example, an analysis as to whether or not the intervals fluctuate (i.e., whether or not a jitter has occurred), an analysis as to whether or not the intervals tend to get longer (i.e., whether or not congestion has occurred anywhere on the communication path), etc.

It is obvious that the time adjustment may be made for other purposes. For example, the adjusted capture time may be used to accurately measure the delay time from a request to a response in the HTTP (Hypertext Transfer Protocol) communication, the elapsed time and/or the response time in other various communications, etc.

Furthermore, in the first through third embodiment, the measuring devices 200a through 200c are connected to the monitor target path 230 respectively through the taps 220a through 220c without a data injection function. However, the taps 220a through 220c may be replaced with taps with the data injection function. In this case, the communication units 214a through 214c are omissible, and the communication units 213a through 213c also operate to provide the function of the communication units 214a through 214c in the first through third embodiment.

Otherwise, the taps 220a through 220c may be replaced with a switching hub with a port mirroring function. In general, a switching hub with the port mirroring function is enabled to transmit data to a port to be monitored by switching its configuration. Therefore, the communication units 214a, 214b, and 214c is omissible.

However, note that a switching hub generally includes a buffer for temporarily storing data to be routed. Accordingly, there occurs a difference between the time point at which a packet actually flows on the monitor target path 230 and the time point at which the measuring device 200a, 200b, or 200c captures the packet through the switching hub.

Therefore, depending on the level of time difference caused by buffering, some switching hubs are not appropriate for time-sensitive purposes such as the time adjustment by the relative time adjustment unit 209a, a jitter analysis using the adjusted time, etc. However, if the time difference caused by buffering falls within an allowance depending on the purpose of the capture, the taps 220a through 220c may be replaced with the switching hub with the port mirroring function.

Furthermore, in the above-mentioned embodiments, in adjusting time in the aggregating operation, the differences in time among the clocks of the measuring devices 200a, 200b, and 200c is corrected by the relative time adjustment unit 209a. However, among a plurality of clocks, not only there may be differences in time, but also there may be differences in rate at which a clock counts time. For example, while the clock of the measuring device 200a counts 60 seconds, the clock of the measuring device 200b may counts 60.5 seconds.

Thus, when the rate of counting time is different among a plurality of clocks, for example, the number of duplicate packet(s) may be set as N (N>1) in the duplicate packet condition. Then, the relative time adjustment unit 209a may calculate the differences in rate of counting time and then may adjust the time. The calculation may be based on, for example, the fluctuation of the difference $d_j$, where $d_j$ denotes the difference in capture time associated with the j-th ($1 \leq j \leq N$) duplicate packet by two measuring devices.

In each of the above-mentioned embodiments, when a packet is double captured by two measuring devices corresponding to two adjacent measuring time periods, it is assumed that the absolute time points of the capture are identical. So far as a plurality of measuring devices are connected to the same network (for example, connected to one collision domain), the assumption is generally regarded to hold.

However, for any reason such as the characteristic of a branching device (such as a tap, a switching hub with the port mirroring function, etc.), the configuration of a network, etc., there may be an embodiment in which there is a difference in absolute time when one packet is double captured by two measuring devices. In this case, if the difference is not negligible, the process in FIG. 1 may be modified, for example as follows, so as to more surely confirm that the same packet is double captured.

That is, in step S102, the sharing control processing device instructs the measuring device B to start the measurement, and also notifies the measuring device B that the "measuring device currently in measurement" is the measuring device A. Then, in step S103, upon recognizing that the duplicate packet condition has been satisfied, the measuring device B transmits, to the measuring device A, the information for identifying the packet(s) captured as a duplicate packet(s) by the measuring device B itself. That is, the measuring device B inquires of the measuring device A whether or not the measuring device A has also captured the same packet(s).

The measuring device A then respond to the inquiry from the measuring device B. If it is confirmed that both measuring devices A and B have captured the same packet(s) as a duplicate packet(s), the measuring device B notifies the sharing control processing device that the duplicate packet condition has been satisfied as in step S103 in FIG. 1.

The modification example above may be further modified so as to transmit the inquiry from the measuring device B to the measuring device A through the sharing control processing device and transmit the response from the measuring device A to the measuring device B through the sharing control processing device.

Otherwise, the measuring device A may stop the capture when it recognizes, based on the inquiry from the measuring device B, that the measuring device A has double captured the same packet(s) as the measuring device B. Then, the measuring device A may notify the sharing control processing device that the measuring device A has stopped the capture.

In any of the embodiments above, the full capture of packets is realizable by a plurality of measuring devices without requiring the time synchronization among the plurality of measuring devices.

That is, in any of the above-mentioned embodiments, before the first measuring device stops the capture, the second measuring device actually captures a packet(s). Accordingly, there is/are a duplicate packet(s) captured by both of the first and second measuring devices. Therefore, even without the time synchronization among a plurality of measuring devices, the full capture of packets by the plurality of measuring devices is realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet capture system comprising:
a plurality of measuring devices that are connected to a same network and are each configured to capture a packet flowing on the network;
a sharing control processing unit that controls sharing of capture of packets flowing on the network among the plurality of measuring devices; and
an aggregating unit that collects the packets captured by the plurality of measuring devices, wherein:
each individual measuring device in the plurality of measuring devices includes:
a capture control unit that controls a start and a stop of the capture by the individual measuring device; and
a capture state notification unit that notifies the sharing control processing unit of a state about the capture performed under control by the capture control unit;
the sharing control processing unit includes:
a sharing control unit that determines which of the plurality of measuring devices is to start the capture, wherein determination by the sharing control unit is made according to a predetermined sharing control rule and the state notified from the capture state notification unit; and
a sharing instruction unit that instructs the plurality of measuring devices to start or stop the capture, wherein instruction by the sharing instruction unit is made according to the determination by the sharing control unit;
when the sharing control unit determines that the capture is to be switched from a first measuring device to a second measuring device, the sharing instruction unit instructs the second measuring device to start the capture;
when the second measuring device has actually captured one or more packets satisfying a duplicate packet condition that specifies one or more duplicate packets to be double captured by two of the plurality of measuring devices, the capture state notification unit in the second measuring device notifies the sharing control processing unit of a first state that the one or more packets satisfying the duplicate packet condition have been actually captured by the second measuring device;
after the capture state notification unit in the second measuring device notifies the sharing control processing unit of the first state-, the sharing instruction unit instructs the first measuring device to stop the capture;
the aggregating unit identifies the one or more duplicate packets satisfying the duplicate packet condition by checking whether an IP address of a reference packet is a same as that of a captured one of the packets, wherein the one or more duplicate packets have been double captured by the first and the second measuring devices and double collected from the first and the second measuring devices; and
according to the identified one or more duplicate packets, the aggregating unit reconstructs without duplication the packets flowing on the network.

2. The packet capture system according to claim 1, wherein:
when the state about the capture satisfies a predetermined stop criterion while the first measuring device performs the capture, the capture state notification unit in the first measuring device notifies the sharing control unit of a second state that the stop criterion is satisfied; and
upon notification of the second state and according to the sharing control rule, the sharing control unit determines that the capture is to be switched from the first measuring device to the second measuring device.

3. The packet capture system according to claim 2, wherein:
the sharing control rule includes an inquiry item to be inquired of one or more inactive measuring devices other than the first measuring device in the plurality of measuring devices;
the inquiry item is inquired when the second state is notified from the capture state notification unit in the first measuring device;
the sharing control rule further includes a selection criterion for selecting one response from one or more responses to the inquiry item;
the packet capture system further comprises an inquiry unit that issues an inquiry to the one or more inactive measuring devices about the inquiry item;
according to the selection criterion, the sharing control unit selects one response from the one or more responses that the one or more inactive measuring devices have returned to the inquiry; and the sharing control unit determines a measuring device which has returned the selected response as the second measuring device.

4. The packet capture system according to claim 3, wherein:
the inquiry item relates to a load of each of the one or more inactive measuring devices; and
the selection criterion is a criterion for selecting a response indicating a lowest load from among the one or more responses returned from the one or more inactive measuring devices.

5. The packet capture system according to claim 2, wherein the stop criterion relates to:
a number of one or more packets to be captured by the first measuring device;
time in which the first measuring device is to perform the capture; or
a load of the first measuring device.

6. The packet capture system according to claim 1, wherein the sharing control rule statically defines a sharing order in which the capture is shared among the plurality of measuring devices.

7. The packet capture system according to claim 1, wherein:
the plurality of measuring devices stores each captured packet in association with capture time at which the packet is captured;
the aggregating unit collects the capture time from each of the plurality of measuring devices; and
the packet capture system further comprises a relative time adjustment unit that adjusts the capture time associated with each of the reconstructed packets and corrects the capture time to a time expressed by a reference clock, wherein adjustment by the relative time adjustment unit is made according to a difference between a first capture time and a second capture time associated with one duplicate packet by the first and second measuring devices.

8. The packet capture system according to claim 1, further comprising
a duplicate packet specification unit that specifies the duplicate packet condition to the plurality of measuring devices, wherein
the duplicate packet condition includes at least one of a number, a type, a source, and a destination of the one or more duplicate packets to be double captured by the first and the second measuring devices,
the first state indicates that the second measuring device has captured one or more packets satisfying the duplicate packet condition after the sharing instruction unit instructs the second measuring device to start the capture.

9. The packet capture system according to claim 1, wherein the duplicate packet condition includes information which specifies that the type of the one or more duplicate packets is a beacon packet which is transmitted at regular intervals.

10. The packet capture system according to claim 1, wherein the capture state notification unit notifies the sharing control processing unit of the state through a communication path different from the network.

11. A packet capture method performed by a packet capture system that includes a plurality of measuring devices connected to a same network, the packet capture method comprising:

instructing a first measuring device in the plurality of measuring devices to start capturing packets flowing on the network;
causing the first measuring device to monitor whether a stop criterion is satisfied, wherein the stop criterion is predetermined with respect to a number of packets to be captured, time in which capture is to be performed, or a load of the first measuring device;
causing the first measuring device to issue a first notification when the stop criterion is satisfied, wherein the first notification indicates that the stop criterion has been satisfied;
determining that the capture is to be switched to a second measuring device in the plurality of measuring devices, wherein the determining is made according to a predetermined sharing control rule and is made when the first notification is issued;
instructing the second measuring device to start the capture;
causing the second measuring device to issue a second notification when the second measuring device has actually captured one or more packets satisfying a duplicate packet condition that specifies one or more duplicate packets to be double captured by two of the plurality of measuring devices determined by checking whether an IP address of a reference packet is a same as that of a captured one of the packets, wherein the second notification indicates that the one or more packets satisfying the duplicate packet condition have actually been captured by the second measuring device;
instructing the first measuring device to stop the capture after the second notification is issued;
collecting packets captured by the plurality of measuring devices;
identifying the one or more packets satisfying the duplicate packet condition, wherein the one or more packets have been double captured by the first and the second measuring devices and double collected from the first and second measuring devices; and
reconstructing packets flowing on the network without duplication according to the identified one or more duplicate packets.

12. An information processing device comprising:
a sharing control unit that determines which of a plurality of measuring devices is to start capture of a packe; and
a sharing instruction unit that instructs the plurality of measuring devices to start or stop the capture, wherein
the plurality of measuring devices are connected to a same network and are each configured to capture a packet flowing on the network;
determination by the sharing control unit is made according to a predetermined sharing control rule and a state about the capture notified from at least one of the plurality of measuring devices;
instruction by the sharing instruction unit is made according to the determination by the sharing control unit;
when the sharing control unit determines that the capture is to be switched from a first measuring device to a second measuring device, the sharing instruction unit instructs the second measuring device to start the capture;
receiving from the second measuring device a notification that the second measuring device has actually captured one or more packets satisfying a duplicate packet condition that specifies one or more duplicate packets to be double captured by two of the plurality of measuring devices determined by checking whether an IP address of a reference packet is a same as that of a captured one of the packets; and upon receipt of the notification from the second measuring device, the sharing instruction unit instructs the first measuring device to stop the capture.

13. A computer-readable, non-transitory medium storing a program used to direct an information processing device to execute a process, the process comprising:

receiving a first instruction to start packet capture from a sharing control processing unit;

starting capturing packets flowing on a network to which the information processing device and one or more other information processing devices are connected, wherein the starting is made upon receipt of the first instruction;

monitoring whether a stop criterion is satisfied, wherein the monitoring is started upon receipt of the first instruction, and the stop criterion is predetermined with respect to a number of packets to be captured, time in which the packet capture is to be performed, or a load of the information processing device;

issuing a first notification to the sharing control processing unit when first one or more packets satisfying a duplicate packet condition that specifies one or more duplicate packets to be double captured by two information processing devices are actually captured determined by checking whether an IP address of a reference packet is a same as that of a captured one of the packets, wherein the first notification indicates that the one or more first packets satisfying the duplicate packet condition have actually been captured;

issuing a second notification to the sharing control processing unit when the stop criterion is satisfied, wherein the second notification indicates that the stop criterion has been satisfied;

after issuing the second notification, controlling the packet capture to continue until a second instruction to stop the packet capture is received from the sharing control processing unit;

receiving the second instruction from the sharing control processing unit-when the sharing control processing unit confirms that one of the one or more other information processing devices that is instructed by the sharing control processing unit to start capturing packets has actually captured second one or more packets satisfying the duplicate packet condition; and stopping the packet capture upon receipt of the second instruction.

\* \* \* \* \*